(12) United States Patent
Hirota

(10) Patent No.: US 10,160,058 B2
(45) Date of Patent: Dec. 25, 2018

(54) ELECTRIC RESISTANCE WELDED PIPE WELDING APPARATUS

(71) Applicant: NIPPON STEEL & SUMITOMO METAL CORPORATION, Tokyo (JP)

(72) Inventor: Yoshiaki Hirota, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 719 days.

(21) Appl. No.: 14/420,848

(22) PCT Filed: Jul. 30, 2013

(86) PCT No.: PCT/JP2013/070652
§ 371 (c)(1),
(2) Date: Feb. 10, 2015

(87) PCT Pub. No.: WO2014/027564
PCT Pub. Date: Feb. 20, 2014

(65) Prior Publication Data
US 2015/0217398 A1    Aug. 6, 2015

(30) Foreign Application Priority Data
Aug. 17, 2012    (JP) ................................. 2012-181052

(51) Int. Cl.
*B23K 13/02*    (2006.01)
(52) U.S. Cl.
CPC .................................. *B23K 13/025* (2013.01)
(58) Field of Classification Search
CPC ...... B23K 13/25; B23K 2201/06; B21C 37/08
(Continued)

(56) References Cited

U.S. PATENT DOCUMENTS 2,692,322 A    10/1954    Bennett
3,270,176 A *   8/1966    O'Neill ................. B23K 13/02
                                                                   219/61.2
(Continued)

FOREIGN PATENT DOCUMENTS

CA    1 133 072 A    10/1982
CA    2 222 474 A1    12/1996
(Continued)

OTHER PUBLICATIONS

Japanese Office Action dated Feb. 3, 2015, for Japanese Application No. 2014-513394 with the English translation.
(Continued)

*Primary Examiner* — Dana Ross
*Assistant Examiner* — Kuangyue Chen
(74) *Attorney, Agent, or Firm* — Birch, Stewart, Kolasch & Birch, LLP

(57) ABSTRACT

An apparatus for manufacturing electric resistance welded pipe, in which two across-opening-facing end parts (2*a*, 2*b*) of an open pipe (1) including an opening (2) extending in a running direction are melted by an induction current generated by an induction heating means and joined together at a join portion. The induction heating means includes a first induction coil (3), and the first induction coil (3) is disposed above the opening (2) so as not to encircle the outer circumference of the open pipe (1) and so that a primary current circuit is formed straddling the opening (2).

13 Claims, 25 Drawing Sheets

(58) Field of Classification Search
USPC ...................................... 219/613, 612, 61.7
See application file for complete search history.

(56) References Cited

U.S. PATENT DOCUMENTS

| | | | | |
|---|---|---|---|---|
| 3,397,295 | A | | 8/1968 | Hale |
| 4,197,441 | A | * | 4/1980 | Rudd ..................... B23K 13/02 219/106 |
| 5,571,437 | A | * | 11/1996 | Rudd ................... B23K 13/025 219/607 |
| 7,002,117 | B2 | * | 2/2006 | Thomasset ........... B23K 13/025 156/272.2 |
| 2008/0308550 | A1 | * | 12/2008 | Nemkov ............... B23K 13/025 219/607 |
| 2012/0168408 | A1 | | 7/2012 | Hirota |
| 2014/0202252 | A1 | | 7/2014 | Umehara |

FOREIGN PATENT DOCUMENTS

| | | | |
|---|---|---|---|
| CN | 102648704 A | | 7/2012 |
| EP | 0613751 A1 | * | 9/1994 ........... B23K 13/025 |
| EP | 0613751 A1 | | 9/1994 |
| EP | 2478975 A1 | | 7/2012 |
| EP | 2478989 A1 | | 7/2012 |
| JP | 53-44449 A | | 4/1978 |
| JP | 54-143744 A | | 11/1979 |
| JP | 58-185379 U | | 12/1983 |
| JP | 61-140385 A | | 6/1986 |
| JP | 61-158385 U | | 10/1986 |
| JP | 63-215387 A | | 9/1988 |
| JP | 9-10961 A | | 1/1997 |
| JP | 10-323769 A | | 12/1998 |
| JP | 2005-111502 A | | 4/2005 |
| JP | 2012-16749 A | | 1/2012 |
| JP | 2014-22437 A | | 2/2014 |
| JP | 2014-140785 A | | 8/2014 |
| KR | 10-2012-0041798 A | | 5/2012 |
| WO | WO 96/39789 A1 | | 12/1996 |

OTHER PUBLICATIONS

Japanese Notice of Reasons for Rejection dated Aug. 4, 2015, for Japanese Application No. 2015-094351 with the English translation.
Canadian Office Action dated Oct. 16, 2015, issued in corresponding Canadian Patent Application No. 2,881,368.
Taiwanese Office Action, dated Dec. 28, 2015, for Taiwanese Application No. 102128678, including partial English translation.
Chinese Office Action and Search Report, dated Apr. 14, 2016, for Chinese Application No. 201380042636.6, together with an English translation thereof.
Extended European Search Report, dated May 3, 2016, for European Application No. 13879600.8.
Korean Office Action, dated Jun. 14, 2016; for Korean Application No. 10-2015-7003894, along with an English translation.
Japanese Office Action, dated Nov. 8, 2016, for Japanese Application No. 2015-94351, with an English translation.
Korean Office Action and English translation, dated Feb. 23, 2017, for corresponding Korean Application No. 10-2015-7003894.
"Fundamentals and Applications of High Frequency", (Published by Tokyo Denki University, pp. 79, 80), Nov. 20, 1991.
International Search Report, dated Oct. 15, 2013, issued in PCT/JP2013/070652.
Office Action in Japanese Application No. 2014-513394, dated Sep. 2, 2014.
Written Opinion of the International Searching Authority, dated Oct. 15, 2013, issued in PCT/JP2013/070652.
European Office Action for corresponding European Application No. 13879600.8, dated May 4, 2018.

* cited by examiner

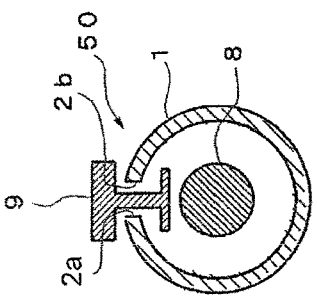
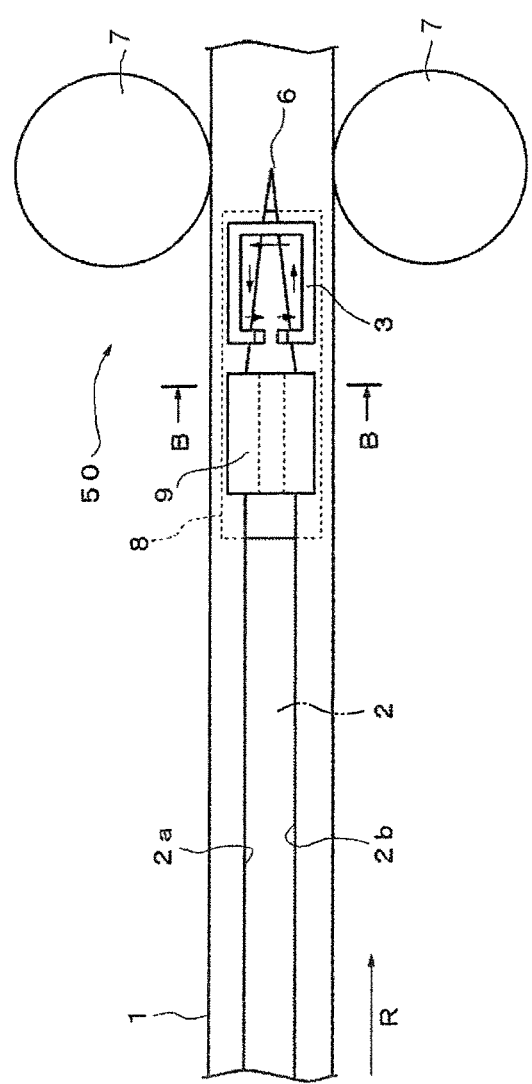

ELECTRIC RESISTANCE WELDED PIPE WELDING APPARATUS

TECHNICAL FIELD

The present invention relates to an electric resistance welded pipe manufacturing apparatus that induction-heats a running metal strip being bent into a circular tube, and that welds the two edges of the metal strip together using electric current induced in the metal strip.

BACKGROUND ART

Generally, methods to manufacture a metal pipe include manufacturing methods for electric resistance welded pipes and spiral tubes in which a pipe shape is formed by welding a metal strip while bending, and manufacturing methods for seamless tubes in which a hole is directly opened in a metal billet, and manufacturing methods in which a tube is formed by extrusion.

Electric resistance welded pipes have particularly high productivity, and are mass producible due to being producible at low lost. With such electric resistance welded pipes, an open pipe is formed in a circular tube shape from a running metal strip, and then a high frequency current is made to flow in end parts of the open pipe that face each other across an opening (also referred to below simply as "end parts of the open pipe") and, in a state of being heated to melting temperature, the two end faces of the two end parts of the open pipe are pressed together into a pipe shape using rolls and welded. When this is being performed, as a method to supply current to the end parts of the open pipe, one example of a method is to wind an induction coil (solenoid coil) so as to surround the outer circumference of an open pipe, and to directly generate an induction current in the open pipe by causing a primary current to flow in an induction coil (see, for example, Patent Document 1 and Non-Patent Document 1), and another method is to press metal electrodes against the end parts of the open pipe, and to directly electrify using current from a power source. A high frequency current of from approximately 100 kHz to approximately 400 kHz is generally employed as the current passing through the induction coil or the electrodes at this time, and a ferromagnet known as an impeder is often placed at the inner face side of the pipe. The impeder is employed to prevent induction current that does not contribute to welding, due to attempting to circulate around the internal circumference of the open pipe.

As a method for causing an induction current in an open pipe, as described in Patent Document 2, there is what is referred to as a toroidal field (TF) heating method in which an induction heating coil with iron core is disposed above the end parts of an open pipe, and the end parts are heated by the action of an alternating magnetic field generated in an iron core by the flow of current in the induction heating coil. However, in a TF method, when the frequency of the supplied current is raised while attempting to reach the melting temperature, since only the outer surface of the welding piece is melted, resulting in defective melting, TF methods are merely employed for the manufacture of electric resistance welded pipes at the pre-heating stage with a low frequency current of from approximately 1 to approximately 3 kHz, as in Patent Document 2.

RELATED DOCUMENTS

Related Patent Documents

Patent Document 1: Japanese Patent Application Laid-Open (JP-A) No. S53-44449Patent Document 2: JP-A No. H10-323769

Related Non-Patent Documents

Non-Patent Document 1: "Fundamentals and Applications of High Frequency" (Published by Tokyo Denki University, pages 79, 80).

SUMMARY OF INVENTION

Technical Problem

FIG. 1 to FIG. 3 are schematic diagrams to explain an electric resistance welded pipe welding process. FIG. 1 is a schematic plan view to explain a process in which an electric resistance welded pipe is manufactured using an induction current generated in the open pipe by winding an induction coil around the outer circumference of an open pipe, and causing primary current to flow in the induction coil. FIG. 2 is a schematic side view of FIG. 1. FIG. 3 is a schematic side cross-section, of the process illustrated in FIG. 1 and FIG. 2. Most of the current flowing at the end parts of the open pipe here flows in the facing end faces; however, in order to simplify explanation, current in FIG. 1 is depicted as if flowing at the top face side (outer surface) of the end part of the open pipe for convenience. In the explanations of other figures below, the current flowing at the two end parts of the open pipe is also depicted as current flowing at the top face side of the two end parts.

As illustrated in FIG. 1, a metal strip 1 that is the welding piece is worked from a flat plate state while running by bending with rolls, not illustrated in the drawings, and formed into the shape of a tube shaped open pipe 1 with two end parts 2a, 2b that face each other, and then the two end parts 2a, 2b are pressed together by squeeze rolls 7 and make contact at a join portion (weld portion) 6. As illustrated in FIG. 1, an induction coil (solenoid coil) 300 is provided upstream of the squeeze rolls 7 in order to melt and join together the two opposing end parts 2a, 2b, and an induction current is generated in the circular tube shaped open pipe 1 directly below the induction coil by high frequency current flowing in the induction coil 300. The induction current circulates at the outer circumference of the open pipe 1 along the induction coil 300 that encircles the open pipe 1. However, due to the two end parts 2a, 2b of the open pipe 1 being opened partway along by the opening, at this portion the induction current is not able to flow directly below the induction coil, and flows broadly in two directions. Namely, as illustrated in FIG. 1, current flowing in a first direction is current 40a, 40b along the two end parts 2a, 2b of the open pipe 1 by passing through a join portion 6, and current flowing in a second direction is current flowing from the opening in the open pipe 1 around the circumferential face. The current flowing at the outer circumference of the open pipe 1 is appended with the reference numerals 40c, 40d in FIG. 1.

The current attempting to flow around the inner circumference of the open pipe 1 is omitted from illustration in FIG. 1. This is since what is referred to as an impeder 8, such as a ferromagnet core made from ferrite or the like, is placed inside the open pipe 1 to raise the impedance at the inner face of the open pipe 1, and to enable current to be prevented from flowing at the inner circumference. Sometimes, in cases in which the diameter of the electric resistance welded pipe to be manufactured is large relative to the out-and-return length, to and from the join portion 6, and the length of the inner circumference of the open pipe 1 is sufficiently long, the impedance of the inner circumference is sufficient even without placement of the impeder 8, and current is suppressed from flowing around the inner circumference.

Normally, the power input to the induction coil 300 is mostly consumed by a portion that the induction coil circulates in the outer circumference of the open pipe 1, and by an out-and-return portion, to and from the join portion 6. Thus the larger the diameter of the electric resistance welded pipe being manufactured, the larger the outer circumference length of the open pipe 1 compared to the out-and-return distance from the induction coil 300, to and from the join portion 6, so the larger the proportion of power that heats the outer circumference of the open pipe 1 compared to the power that heats the end parts of the open pipe 1, with a fall in heating efficiency. Therefore, when conventionally manufacturing large diameter electric resistance welded pipes, sometimes contact conduction is performed by electrodes in which it is possible to suppress current from flowing around the outer circumference of the open pipe. Such contact conduction has the advantage of giving a high welding efficiency; however, there is an issue that defects readily develop in the portions of the electrodes that contact the open pipe, and defects readily develop as sparks occur, due to defective contact between the electrodes and the open pipe or the like. There is accordingly a need to employ a method that uses a non-contact induction coil in order to eliminate the development of such defects. However, as described above, if such a method is applied to manufacturing large diameter electric resistance welded pipes, this results in the proportion of current that circulates and heats the outer circumferential portion of the open pipe being large compared to the current that heats the end parts of the open pipe. There is accordingly a need to increase the power source capacity due to the lower welding efficiency, with issues arising such as increased facility cost, and burnout of the impeder due to being unable to withstand the strong magnetic field due to increased power. Such situations have conventionally meant that production must be performed while suppressing the amount of power so that the impeder does not burnout, leading to a fall in productivity, or production must be performed at low heating efficiency when an impeder is not used.

The present inventors have thoroughly investigated the distribution of induction current generated in the open pipe in order to increase the heating efficiency during electric resistance welding. Conventional explanation, such as that disclosed in Non-Patent Document 1, is that current only flows in the direction from directly below the induction coil towards the join portion. However, the present inventors have surveyed the current distribution using electromagnetic field analysis of the electric resistance welded pipe, and found that actually, as illustrated in FIG. 4, not only does current from directly below the induction coil 300 flow as current in the direction of the join portion 6, but also a significant amount of current 5a, 5b branches off and flows upstream of the induction coil 300. Namely, it has been found that the power supplied to the induction coil 300 does not flow in the join portion 6 efficiently, and is instead a cause of ineffective power (power loss).

In consideration of the above circumstances, an object of the present invention is to provide an electric resistance welded pipe welding apparatus capable of raising the heating efficiency, particularly when manufacturing a relatively large diameter electric resistance welded pipe using an induction coil method, and enabling electric resistance welding to be performed with excellent efficiency using a simple apparatus.

Solution to Problem

After thorough investigation to address the above issues, the present inventors have discovered that high heating efficiency is achieved even when manufacturing a large diameter electric resistance welded pipe, by regulating the shape and placement position of an induction coil, and moreover regulating the shape, placement position, and the like of a ferromagnet or the like, thereby completing the present invention.

Namely, an electric resistance welded pipe welding apparatus of the present invention is an electric resistance welded pipe welding apparatus for manufacturing an electric resistance welded pipe, in which two end parts of an open pipe having an opening extending in a running direction, the two end parts facing the opening, are melted by an induction current generated by an induction heating means, and the two end parts are placed in contact with each other and welded together at a join portion while gradually closing the gap of the opening, wherein: the induction heating means includes at least one induction coil, and a first induction coil, of the at least one induction coil, that is positioned nearest to the join portion is disposed above the opening so as not to encircle an outer circumference of the open pipe and so that a primary current circuit is formed straddling the opening.

In the electric resistance welded pipe welding apparatus of the present invention, when forming the primary current circuit by passing a high frequency current through the first induction coil, preferably the primary current circuit is formed such that, at a portion of the open pipe below the first induction coil and at two outer sides of the opening, one or more secondary current closed circuits including an induction currents passing through at least the end parts of the open pipe are formed in the vicinity of each of the two end parts.

Moreover, in the electric resistance welded pipe welding apparatus of the present invention, preferably the frequency of the high frequency current is 100 kHz or higher.

Moreover, in the electric resistance welded pipe welding apparatus of the present invention, preferably a first ferromagnet is disposed further to an upstream side than the first induction coil in the running direction of the open pipe, and between the two opposing end parts.

Moreover, in the electric resistance welded pipe welding apparatus of the present invention, preferably the cross-sectional profile of the first ferromagnet is a T-shape, an inverted T-shape, an I-shape, or an H-shape turned on its side in cross-section orthogonal to the running direction of the open pipe.

Moreover, in the electric resistance welded pipe welding apparatus of the present invention, preferably a second ferromagnet is disposed between the two end parts of the open pipe and inside the first induction coil.

Moreover, the electric resistance welded pipe welding apparatus of the present invention preferably includes a third ferromagnet that at least partially covers the first induction coil, above the first induction coil.

Moreover, in the electric resistance welded pipe welding apparatus of the present invention, preferably the third ferromagnet has a configuration that divides, at a position corresponding to the opening in the open pipe, into a first half covering substantially a half of the first induction coil and a second half covering substantially a remaining half of the first induction coil in the width direction.

Moreover, in the electric resistance welded pipe welding apparatus of the present invention, at an upstream side of the induction current passing through each of the end parts of the open pipe at the secondary current closed circuits formed by the primary current circuit of the first induction coil, preferably a conductor, including a pair of conductor sections provided so as to be separated from and to face toward the end parts is disposed inside the opening at the running direction upstream side of the open pipe so as to generate an induction current in an opposite direction to the induction current in each of the end parts of the open pipe.

Moreover, in the electric resistance welded pipe welding apparatus of the present invention, the conductor is preferably electrically connected to the first induction coil.

Moreover, in the electric resistance welded pipe welding apparatus of the present invention, preferably a fourth ferromagnet extending along the pair of conductor sections is disposed between the pair of conductor sections of the conductor.

Moreover, in the electric resistance welded pipe welding apparatus of the present invention, the fourth ferromagnet is preferably electrically insulated from the pair of conductor sections.

Moreover, the electric resistance welded pipe welding apparatus of the present invention preferably includes a fifth ferromagnet having an inside section extending in the running direction inside the open pipe, an outside section extending in the running direction outside the open pipe, and a center section extending between the inside section and the outside section inside a space defined by the first induction coil, wherein the fifth ferromagnet is disposed with an open space side, which is defined by potions of the inside section and the outside section further toward a downstream side than the center section and by the center section, facing toward the running direction downstream side, and the fifth ferromagnet forms a closed circuit of magnetic flux passing through the inside section, the center section, and the outside section.

Moreover, in the electric resistance welded pipe welding apparatus of the present invention, preferably at least one downstream side end portion of the outside section or the inside section of the fifth ferromagnet has a branched shape.

Moreover, in the electric resistance welded pipe welding apparatus of the present invention, preferably the first induction coil is formed such that a distance to the open pipe widens from the opening towards the sides.

Advantageous Effects of Invention

According to the electric resistance welded pipe welding apparatus of the present invention, so as to form at least two or more closed circuits from induction current flowing at the surface of the open pipe at the two outsides of the opening in the vicinity of the two end parts of the open pipe, a configuration is adopted in which the induction coil disposed at a position separated from the opening in the pipe outside direction and formed so as not to encircle the outer circumference of the open pipe, namely not making one lap of the outer circumference thereof, so that a closed circuit is formed straddling the opening. Thereby, during electric resistance welded pipe welding by forming a tube shape while bending a running metal strip, in comparison to conventional work coil methods, the heating efficiency can be effectively raised with a simple device even in cases in which there is a large diameter of electric resistance welded pipe to be manufactured, and there is accordingly no need to provide a large capacity power source. Moreover, by using a simple set up, since there is less necessity to change the shape of induction coil to match the dimensions and profile of electric resistance welded pipe being manufactured, this enables the number of work coils (induction coils) stocked to be reduced, and so enables facility cost to be suppressed further, enabling introduction at low cost even when utilizing an existing power source.

Moreover, along with raising the heating efficiency as described above, it is possible to implement savings in energy by reducing the amount of power used, or, an increase in line speed can be achieved when the same power is input, enabling productivity to be increased. Moreover, there are immeasurable industrial advantageous effects due to it being possible to manufacture electric resistance welded pipes of sizes that were hitherto difficult to manufacture due to conventional limitations in power source capacity, and limitations due to burn out of impeders from large power input.

BRIEF DESCRIPTION OF DRAWINGS

FIG. 8A, FIG. 8B is a schematic diagram to explain an electric resistance welded pipe welding apparatus according to the exemplary embodiment of the present invention, FIG. 8A is a plan view illustrating an example in which a first ferromagnet is placed between two end parts upstream of a first induction coil, and FIG. 8B is a cross-section taken on line B-B of FIG. 8A.

DESCRIPTION OF EMBODIMENTS

Explanation next follows regarding exemplary embodiments of an electric resistance welded pipe welding apparatus of the present invention, with reference to FIG. 1 to FIG. 43. The exemplary embodiments are for the purpose of detailed explanation to give a better understanding of the principles of the invention, and do not limit the present invention unless otherwise stated.

Generally, for an electric resistance welded pipe, a tube shaped open pipe is formed by bending a running metal strip, cut to a width matching the diameter of the pipe to be made, with rolls such that the two width direction end parts of the metal strip face each other. Then, an induction current caused by an induction coil is used to cause an induction current to flow in the open pipe, and the end parts (the end portions facing across the opening) of the open pipe are heated and melted. Then, in downstream processing, the two opposing end parts of the open pipe are pressed into close contact by squeeze rolls and joined (welded) to obtain an electric resistance welded pipe. Reference here in the explanation of the present invention to "downstream" means downstream in the running direction of the metal strip or open pipe, and when reference is made below to "upstream" and "downstream" this means the "upstream" and "downstream" in the running direction of the metal strip or open pipe.

First Exemplary Embodiment

Figure 1:
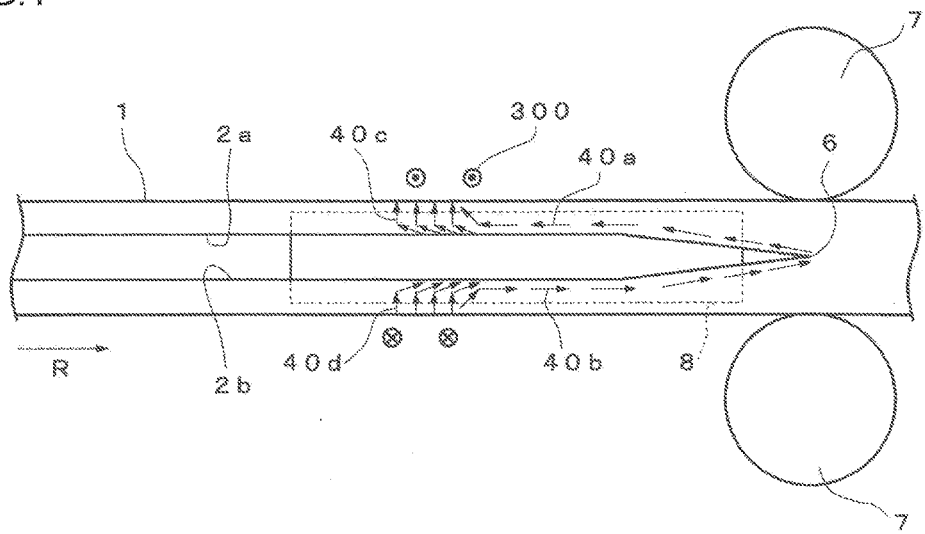
FIG. 1 is a schematic plan view illustrating a current distribution in an electric resistance welded pipe welding apparatus employing an induction coil, based on conventional thinking.
Figure 2:
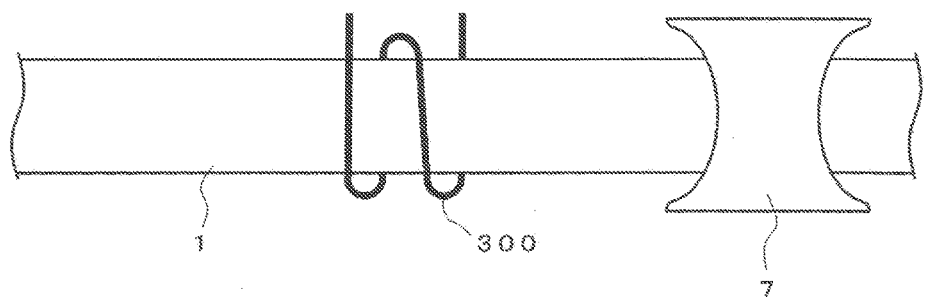
FIG. 2 is a schematic side view to explain the electric resistance welded pipe welding apparatus employing an induction coil explained at FIG. 1.
Figure 3:
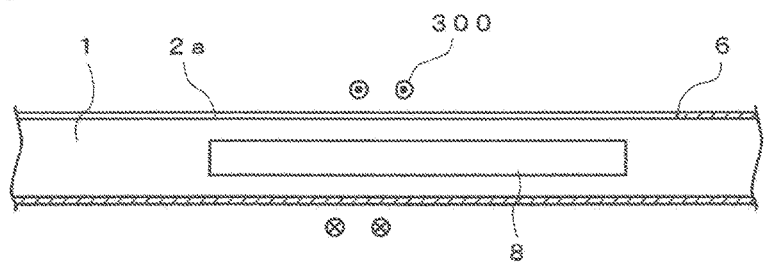
FIG. 3 is a schematic side cross-section of the electric resistance welded pipe welding apparatus illustrated in FIG. 1.
Figure 4:
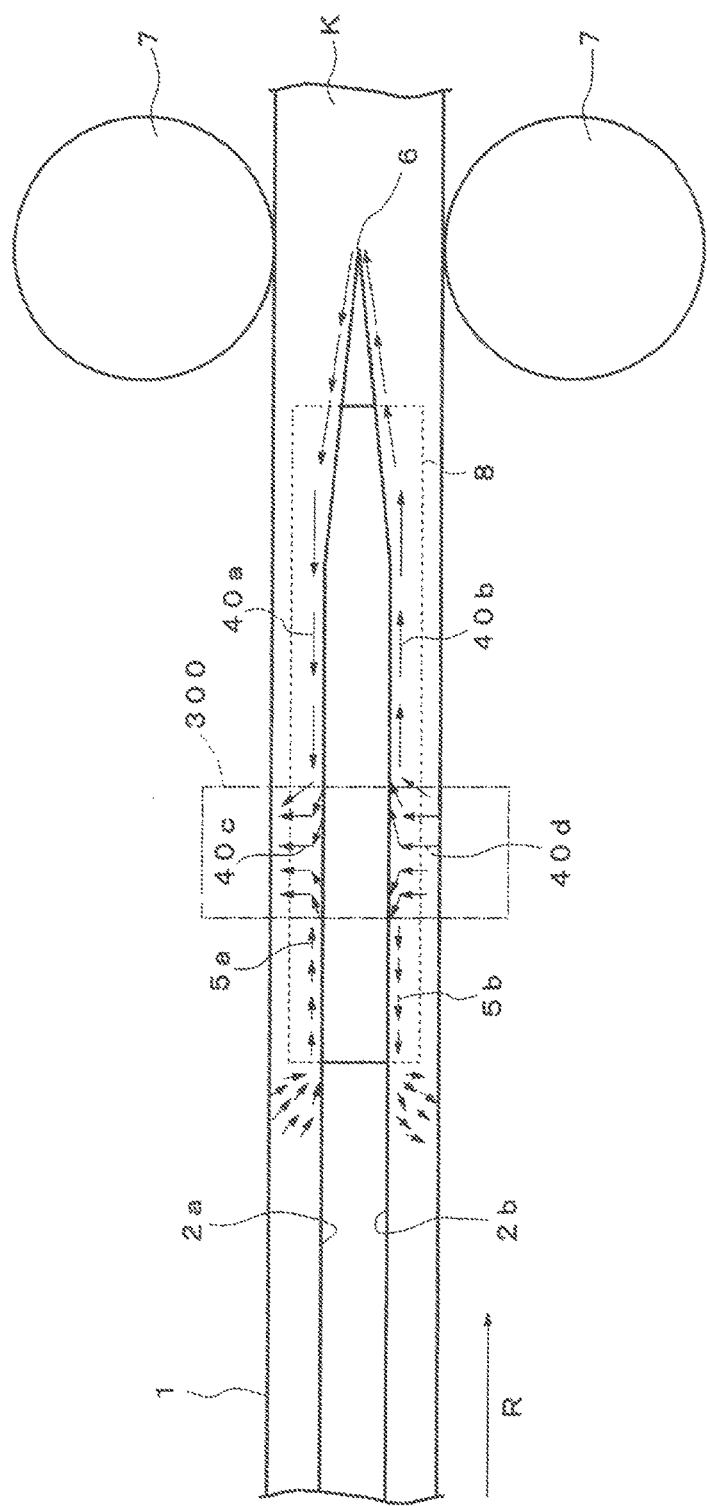
FIG. 4 is a schematic plan view illustrating a current distribution based on electromagnetic field analysis.
Figure 5:
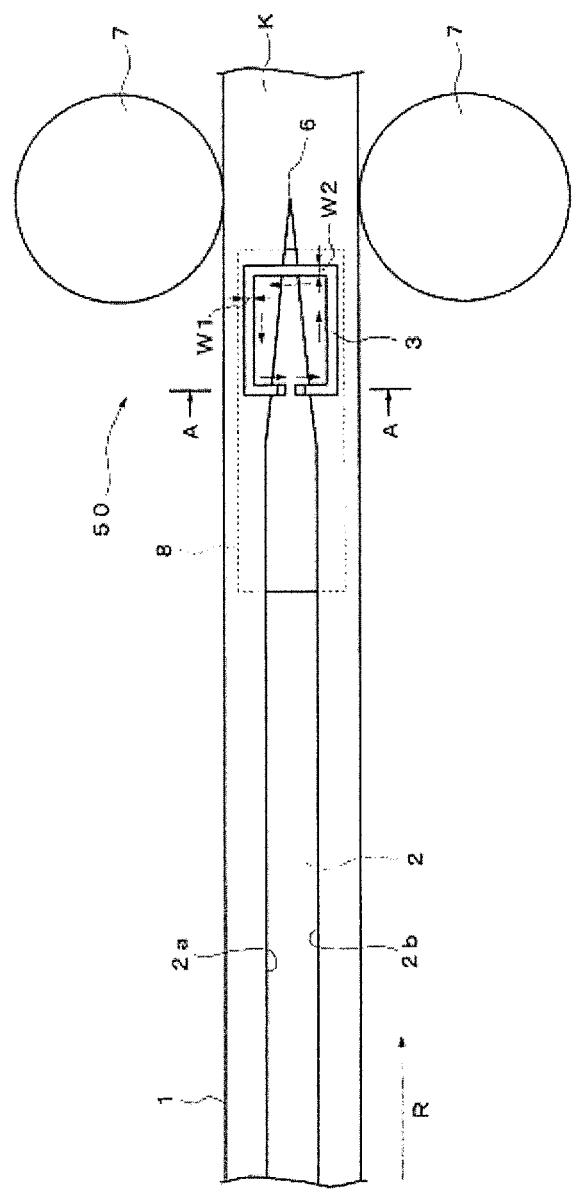
FIG. 5 is a schematic plan view to explain an electric resistance welded pipe welding apparatus according to an exemplary embodiment of the present invention.
Figure 6:
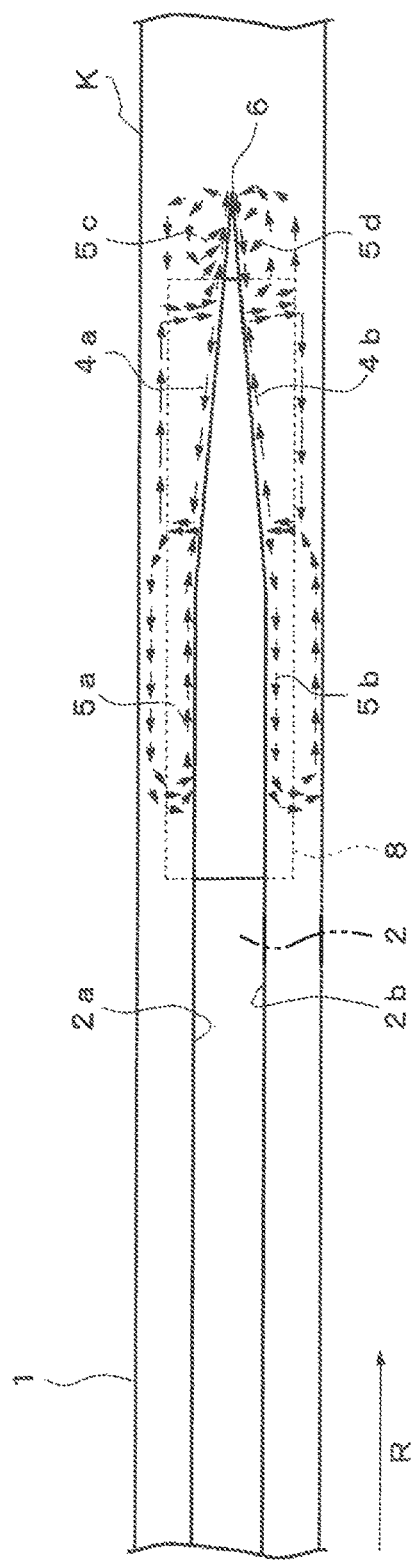
FIG. 6 is a schematic plan view to explain a current distribution in a case in which an electric resistance welded pipe welding apparatus according to the exemplary embodiment of the present invention is employed.

FIG. 5 is a schematic plan view illustrating an electric resistance welded pipe welding apparatus 50 in a first exemplary embodiment of the present invention. FIG. 6 is a plan view schematically illustrating a distribution of induction current generated when electric resistance welded pipe welding is performed using the electric resistance welded pipe welding apparatus 50 illustrated in FIG. 5.

The electric resistance welded pipe welding apparatus 50 illustrated in FIG. 5 is an apparatus that uses rolls to bend a running metal strip 1 running in running direction R into a circular tube shape such that two width direction end parts (end portions) 2a, 2b of the metal strip 1 face each other with a separation open therebetween to form an open pipe 1, and then passes a high frequency current through the vicinity of an opening 2 of the open pipe 1 so as to heat and melt the two end parts 2a, 2b while the gap of the opening 2 gets gradually narrower, and to place the two end parts 2a, 2b in contact with each other weld the two end parts 2a,2b together. More specifically, the overall configuration of the electric resistance welded pipe welding apparatus 50 of the present exemplary embodiment is such that an induction coil (first induction coil) 3 is disposed at a position separated in a pipe outside direction from (above) the opening 2 and formed with a closed circuit of at least one turn or more so as to straddle the opening 2 and so as not to go one lap around (encircling) the outer circumference of the circular tube shaped open pipe 1, such that at least two or more closed circuits configured from induction currents 4a, 4b, as illustrated in FIG. 6, flow in a surface layer of the open pipe 1 toward the two outsides of the opening 2 in the vicinity of the two end parts 2a, 2b of the open pipe 1. "One turn" does not only mean making a complete one turn in plan view such that one end portion and the other end portion in the winding direction of the first induction coil 3 meet or overlap with each other, but also encompasses, as illustrated in FIG. 5 and elsewhere, one end portion ending just before the other end portion so as not to form a complete lap. Due to employing the electric resistance welded pipe welding apparatus 50 configured as described above, the present exemplary embodiment is configured to form a primary induction current path of at least one turn or more to straddle the opening 2 of the open pipe 1 inside the first induction coil 3.

The first induction coil 3 of the present invention as explained below is formed from a pipe, wire, plate, or the like of a good conductor, such as copper, and the material and the like thereof are not particularly limited. The shape of the first induction coil 3 may also be a rectangular or circular tube, and is not particularly limited. As illustrated in FIG. 5, in the present exemplary embodiment, the first induction coil 3 is placed upstream of a join portion 6 of the circular tube shaped open pipe 1, and disposed in close proximity to the open pipe 1 so as to cross over at least two locations on the opening 2 of the open pipe 1.

Figure 7:
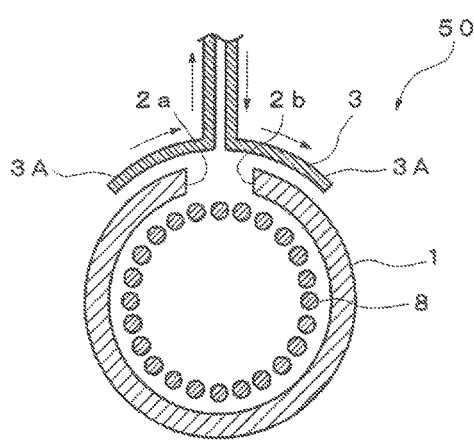
FIG. 7 is a schematic diagram to explain an electric resistance welded pipe welding apparatus according to the exemplary embodiment of the present invention, and is a cross-section taken on line A-A in FIG. 5.
Figure 9:
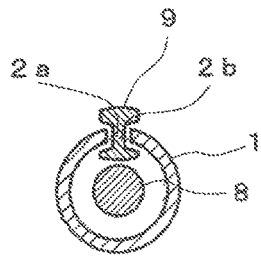
FIG. 9 is a cross-section illustrating an example of a substantially H-shaped turned on its side first ferromagnet with a curved profile placed between two end parts, in a schematic diagram to explain an electric resistance welded pipe welding apparatus according to the exemplary embodiment of the present invention.

FIG. 7 is a schematic cross-section taken along line A-A of FIG. 5.

In a conventional induction heating method, as illustrated in the examples of FIG. 1 to FIG. 4, a coil is formed with one or more turn encircling the outside of a circular tube shaped open pipe 1 in the circumferential direction. In contrast thereto, in the present invention, the first induction coil 3 is formed so as not to encircle the entire periphery of the open pipe 1 and such that the number of windings around the outer circumference of the open pipe 1 is less than one lap, formed in a closed circuit of at least one turn or more in a substantially flat plane shape, and the first induction coil 3 is disposed at a position separated from the open pipe 1, so as to provide a gap and not be in contact with the open pipe 1, and so as to straddle the opening 2 of the open pipe 1. In the example illustrated in FIG. 7, the first induction coil 3 illustrated is configured to cross over at the upper side of the two end parts 2a, 2b of the open pipe 1 towards a power source, not illustrated in the drawings, provided thereabove. In the present exemplary embodiment, by forming a primary current circuit by causing a high frequency current to flow in the first induction coil 3, at the two outsides of the opening 2 below the primary current circuit, one or more closed circuits of secondary current are formed including at least induction current flowing in the two end parts 2a, 2b of the open pipe 1, at the respective vicinities of the two end parts 2a, 2b. In the present invention, high frequency means 10 kHz or greater, and preferably 100 kHz or greater.

In the example illustrated in FIG. 7, the current flowing in the first induction coil 3, first, in plan view, flows along the first induction coil 3 from the upper right side of FIG. 7 connected to the power source, not illustrated in the drawings, toward the bottom, then crosses over above the one end part 2b of the open pipe 1, toward the right, before flowing from the nearside to the far side in the depth direction of FIG. 7 (see the arrow direction illustrated in FIG. 5). The current flowing in the first induction coil 3 furthermore crosses over above the one end part 2b of the open pipe 1 again, this time toward the left, and continues by flowing so as to cross over above the other end part 2a, toward the left (see also FIG. 5), then, after flowing from the far side toward the nearside in the depth direction of FIG. 7, flows toward the right side. The current flowing in the first induction coil 3 then crosses over above the other end part 2a of the open pipe 1 again, this time toward the right, and finally flows upwards in FIG. 7, to return to the power source, not illustrated in the drawings.

A distribution of induction current in the open pipe 1 occurs when the current flows in the first induction coil 3 along the path described above, such as that illustrated by the arrows in FIG. 6. As illustrated in FIG. 5, when the primary current flows anticlockwise in the first induction coil 3, the induction currents 4a, 4b are generated clockwise at portions of the open pipe 1 corresponding to the first induction coil 3, as illustrated in FIG. 6. The induction currents 4a, 4b are unable to flow as induction current in the space of the opening 2 at the portions where the first induction coil 3 crosses over the opening 2 of the open pipe 1, such that the induction current unable to cross over the space of the opening 2 flows along the end part 2a and the end part 2b of the open pipe 1. Thus loops (closed circuits) of the main current from the induction currents 4a, 4b develop respectively at the edge 2a side and the end part 2a side and end part 2b side of the open pipe 1, heating the end parts of the open pipe 1 including the end faces (the faces facing across the opening 2).

In the present exemplary embodiment, as illustrated in FIG. 6, there are 2 loops formed from the induction currents 4a, 4b flowing in a surface layer of the open pipe 1 at the two outsides of the opening 2 in the vicinity of the two end parts 2a, 2b of the open pipe 1. When this occurs, in the vicinity of the first induction coil 3 at the join portion (weld portion) 6 side (downstream side), the width of the opening 2 in the open pipe 1 is narrow, and the impedance is low, such that at the side of the first induction coil 3 crossing over above the opening 2 in the vicinity of the join portion 6, induction currents 5c, 5d develop due to a portion of the induction current branching off and flowing toward the join portion 6 side. Thus in the branched flow of the induction currents 5c, 5d as described above, current is concentrated by the proximity effect of being close to between the two end parts 2a, 2b of the opening 2 at the vicinity of the join portion 6, and the two end parts 2a, 2b are melted due to reaching a higher temperature, and welded together.

However, as illustrated in FIG. 6, at the upstream side of the first induction coil 3, induction currents 5a, 5b flow due to a portion of induction current flowing through the two end parts 2a, 2b of the open pipe 1. The induction currents 5a, 5b separate from the join portion 6, and disrupt concentration of induction current flowing in the vicinity of the join portion 6 and so lower the welding efficiency. Consequently, in order to suppress the occurrence of such induction currents, in an electric resistance welded pipe welding apparatus of an exemplary embodiment illustrated in FIG. 8A, FIG. 8B, a ferromagnet (first ferromagnet) 9 is disposed between the two end parts 2a, 2b to the upstream side of the first induction coil 3 and at a position corresponding to the opening 2. FIG. 8B is schematic cross-section taken along line B-B illustrated in FIG. 8A, and shows a state in which the first ferromagnet 9 is disposed between the two end parts 2a, 2b, and spans from the inside to the outside of the opening 2 (passing through the opening 2 from the inside to the outside of the open pipe 1).

The first ferromagnet 9 is disposed between the two end parts 2a, 2b of the open pipe 1 in a loosely inserted state to the opening 2, and acts to disrupt the induction currents 5a, 5b flowing in the two end parts 2a, 2b of the open pipe 1, raising the impedance, and suppressing induction current from flowing to the upstream side of the first induction coil 3. Therefore the induction current generated at the outside surface of the open pipe 1 by electromagnetic induction has a flow that is concentrated at the join portion 6 side, raising the current density of the currents 4a, 4b, 5c, 5d that are effective in welding. Thus a smaller supply of power is sufficient compared to cases in which the first ferromagnet 9 is not disposed, enabling a saving in energy. Alternatively, it is possible to increase the line speed if the same power is input to that of cases in which the first ferromagnet 9 is not disposed, enabling productivity to be raised.

In order to determine the shape of the first ferromagnet 9, the present inventors have, as a result of electromagnetic field analysis and measuring the actual heating temperature distribution, determined that the currents 5a, 5b flow in the end parts 2a, 2b of the open pipe 1, with particularly large flow in the upper end edge (top side corner portion) and the lower end edge (bottom side corner portion) of the end parts 2a, 2b. Thus, as in the example illustrated in FIG. 8A, FIG. 8B, the first ferromagnet 9 is preferably disposed at a position corresponding to the opening 2 between the two end parts 2a, 2b of the open pipe 1, and also has a structure so as to cover one or both of the top side corner portion or bottom side corner portion of the two end parts 2a, 2b. The example illustrated in FIG. 8B illustrates a structure in which the first ferromagnet 9 covers both the top side corner portion and bottom side corner portion of the two end parts 2a, 2b.

The first ferromagnet 9 is shaped, as in the example illustrated in FIG. 8B, so as to form an H-shape turned on its side in cross-section, thereby obtaining the greatest suppression effect to the induction currents 5a, 5b flowing at the upstream side. Namely, the first ferromagnet 9 is preferably shaped with a vertically extending face so as to not only cover the flat face portions (end faces) of the two end parts 2a, 2b of the open pipe 1, but so as to also extend out so as to cover the top side corner portion and the bottom side corner portion of the open pipe 1. The first ferromagnet 9 may be configured, as in the example illustrated in FIG. 9, such that each of the angular portions has a curved face. Moreover, the shape of the first ferromagnet 9 is not limited to shapes such as those of FIG. 8B or FIG. 9, and may, for example, have a T-shaped profile in cross-section taken orthogonal to the running direction R of the open pipe 1 such as the example illustrated in FIG. 10, an I-shaped cross-section profile such as the example illustrated in FIG. 11, as well as an inverted T-shaped cross-section profile such as the example illustrated in FIG. 12. In such cases, the greatest suppression effect to the induction currents 5a, 5b is exhibited for, in order of greatest first, the H-shaped turned on its side cross-section, the T-shaped cross-section, the inverted T-shaped cross-section, and the I-shaped cross-section.

Forming the external profile of the first ferromagnet 9 with straight lines is not particularly necessary.

Examples of the material of the first ferromagnet 9 include ferromagnetic materials with a low electrical conductivity, such as ferrite and magnetic steel sheet, and amorphous materials.

The position for disposing the first ferromagnet 9 may be anywhere upstream of the first induction coil 3, and a position near to the first induction coil 3 is more effective in preventing at source current from flowing upstream. However, if the first ferromagnet 9 is placed too near to the first induction coil 3, then heat generation in the first ferromagnet 9 readily occurs due to the strong magnetic field. Therefore, although it depends on the strength of the current flowing in the first induction coil 3 and the like, the first ferromagnet 9 is preferably disposed 10 mm or more away from the first induction coil 3 on the upstream side, and, during implementation, a position where there is an appropriate lack of influence is more preferably found according to the strength of the magnetic field. In such cases, although it depends on the strength of the magnetic field, as viewed along the running direction R, advantageous characteristics are often obtained by disposing the downstream side edge of the first ferromagnet 9 separated from the upstream side edge of the first induction coil 3 in a range of, for example, from 10 mm to 200 mm. It is even more effective to forcibly cool the first ferromagnet 9 using water cooling or air cooling means or the like. In relation to the dimensions of the first ferromagnet 9, although no particular stipulations arise from different conditions of use, sufficient advantageous effect is exhibited when length in the running direction R is approximately several tens of mm, and moreover, in relation to thickness, a thickness such that contact is not made with the open pipe 1 is sufficient, and a higher effect is achieved with a thickness so as to be in close proximity to the opening 2.

In relation to the manner in which the first ferromagnet 9 is disposed, it is possible to raise the suppressing effect on induction current flowing upstream in the first induction coil 3 by combination with an impeder 8 to suppress induction current flowing around the inner circumferential face of the open pipe 1, and disposing the first ferromagnet 9 in a state such that induction current is stopped by the impeder 8 from flowing from the two end parts 2a, 2b of the open pipe 1 toward the inner circumference of the open pipe 1.

Figure 13:
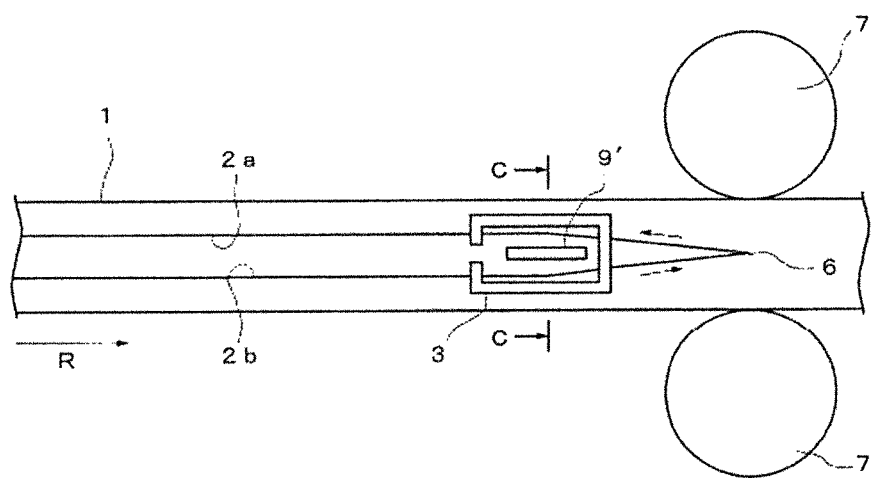
FIG. 13 is a schematic plan view illustrating a modified example of an electric resistance welded pipe welding apparatus according to the exemplary embodiment of the present invention.
Figure 14:
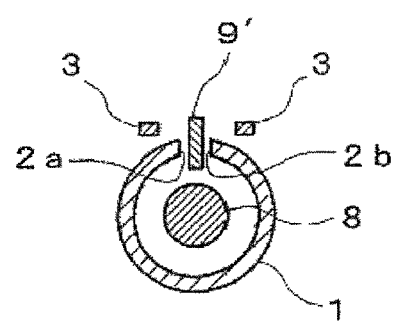
FIG. 14 is cross-section taken on line C-C of FIG. 13, illustrating the electric resistance welded pipe welding apparatus of FIG. 13.

In a modified example of the present exemplary embodiment, as illustrated in FIG. 13 and FIG. 14, by disposing a ferromagnet (second ferromagnet) 9' at the inside of the first induction coil 3 and between the two end parts 2a, 2b of the open pipe 1, the current density is increased at the downstream side of the first induction coil 3, namely flowing toward the join portion 6 side. More precisely, in cases in which the first induction coil 3 is disposed as illustrated in FIG. 5, in order to increase the induction current toward the join portion 6 and to increase the welding efficiency, the first induction coil 3 is preferably placed as close as possible to the join portion 6 so as to lower the impedance at the join portion 6 side. However in practice, due to the squeeze rolls 7 and other rolls, not illustrated in the drawings, being placed in the vicinity above the join portion 6, so as to encroach toward the first induction coil 3 side, the first induction coil 3 must be placed a certain degree of distance away from the join portion 6. Therefore, in order to facilitate flow of induction current to the join portion 6 side even when the first induction coil 3 is distanced from the join portion 6, in the apparatus of the present exemplary embodiment, the second ferromagnet 9' is, as illustrated in FIG. 13 and FIG. 14, placed at the inside of the first induction coil 3 and between the two end parts 2a, 2b of the open pipe 1. The induction current generated by the first induction coil 3, corresponds to the first induction coil 3, includes the two end faces of the open pipe 1 (faces that face across the opening 2) as illustrated in FIG. 6, and forms closed circuits at both sides of the opening 2 of the open pipe 1, such that a portion of the induction current flows in the join portion 6. For convenience of illustration, the induction current flowing at the end faces of the open pipe 1 is illustrated as flowing in an upper portion in the vicinity of the end faces. The second ferromagnet 9' increases the impedance between the second ferromagnet 9' and the end faces of the open pipe 1, and acts to prevent the flow of any current attempting to flow in the end faces. As a result, the induction current generated in the open pipe 1 by the first induction coil 3, reduces the current flowing at the end face side of the open pipe 1, so as to exhibit an effect to increase the amount of current flowing toward the join portion 6 side. In an electric resistance welded pipe, the shorter the duration of exposure to high temperature, the more the generation of oxides is suppressed, and a narrower region of the high temperature portion enables deterioration in quality due to high temperature to be avoided. It is accordingly preferable to reach the melting temperature within a short period of time, and current increase toward the join portion 6 side also has the effect of stabilizing weld quality. It is sufficient for the second ferromagnet 9' to be disposed between the end faces of the open pipe 1, as illustrated in FIG. 14, and a depth direction length of at least the plate thickness of open pipe 1 or greater is sufficient, and preferably extends past the upper corners and lower corners of the end faces of the open pipe 1 facing across the opening 2. Regarding the profile, instead of being an I-shape as illustrated in FIG. 14, various other profiles may also be employed, similarly to with the first ferromagnet 9 as explained with reference to FIG. 9 to FIG. 12. The second ferromagnet 9' may be formed from a ferromagnetic material, such as ferrite and magnetic steel sheet, and amorphous materials. The second ferromagnet 9' preferably has a cross-section surface area such that magnetic flux saturation does not occur due to being placed inside a strong magnetic field. Moreover, a cooling means, such as air cooling or water cooling, is preferably applied to the second ferromagnet 9' in order to suppress heat generation.

Figure 15:
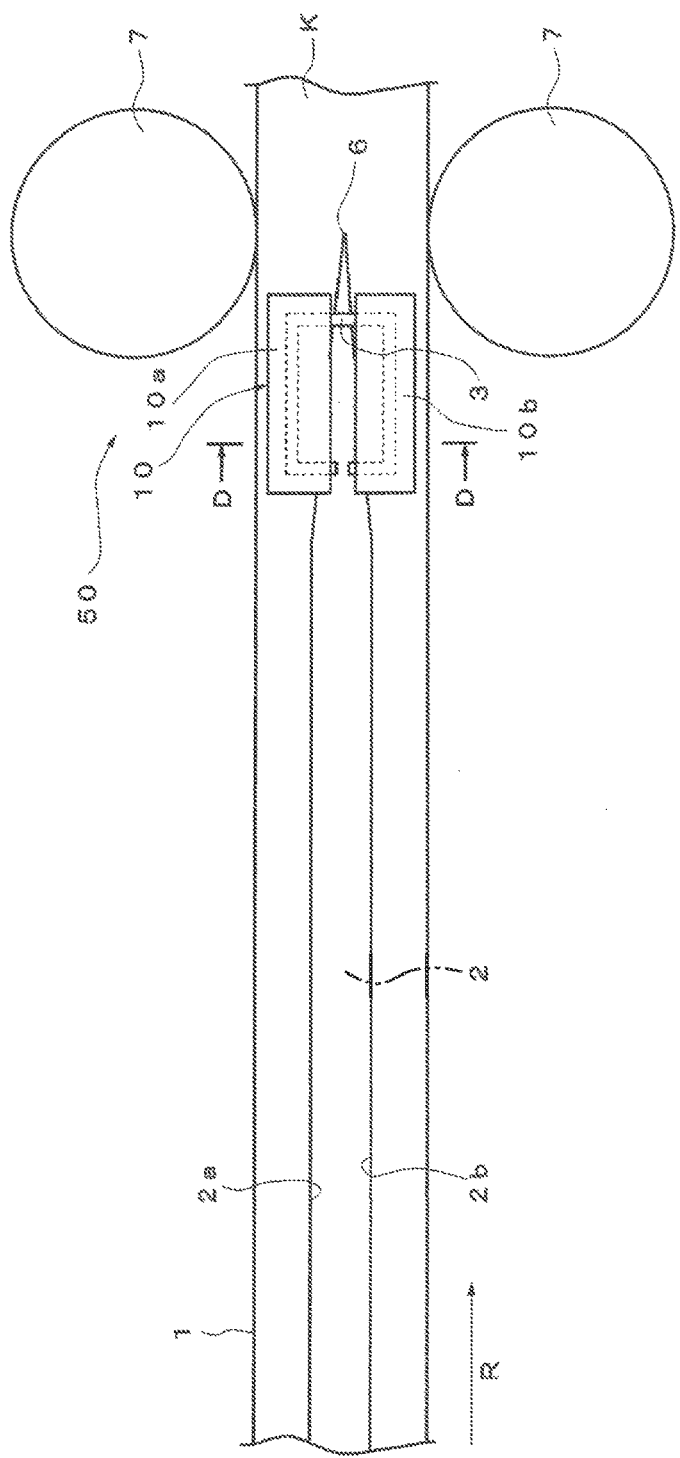
FIG. 15 is a plan view illustrating an example of a third ferromagnet placed above an induction coil, in a schematic diagram to explain a modified example of an electric resistance welded pipe welding apparatus according to the exemplary embodiment of the present invention.
Figure 16:
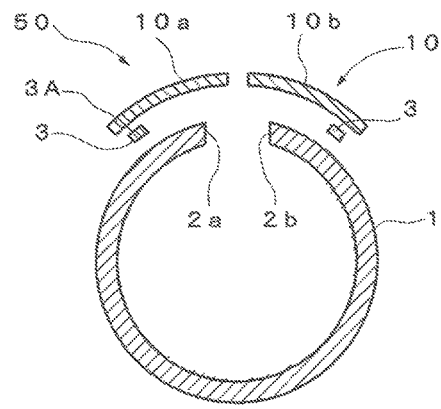
FIG. 16 is a cross-section taken along line D-D of FIG. 15, illustrating the electric resistance welded pipe welding apparatus of FIG. 15.

As another modified example of the present exemplary embodiment, as illustrated in FIG. 15 and FIG. 16, in order to raise the welding efficiency, a plate shaped ferromagnet (third ferromagnet) 10, separate to the first terromagnet 9, is provided in close proximity to a back face (top face) 3A of the first induction coil 3. In order to simplify explanation, FIG. 15 is a schematic plan view illustrating an example of a configuration with an impeder 8 omitted from illustration, and FIG. 16 is a schematic cross-section taken along line D-D illustrated in FIG. 15. In the example illustrated, the third ferromagnet 10 is provided in the vicinity of the outside of the first induction coil 3 (the back face 3A side). More specifically, the third ferromagnet 10 is provided at the back face 3A side of the first induction coil 3, this being the opposite side to that of the opening 2, so as to substantially cover the first induction coil 3. The third ferromagnet 10 is preferably shaped with a shape that follows the first induction coil 3, namely, as illustrated in FIG. 16, in cases in which the first induction coil 3 is formed so as to curve to follow the open pipe 1, the third ferromagnet 10 is also preferably formed so as to curve in a similar manner, and the third ferromagnet 10 is also preferably formed flat (not illustrated in the drawings) in cases in which the first induction coil 3 is shaped flat so as not to follow the open pipe 1 (FIG. 24), described below. Moreover, in the illustrated example, the third ferromagnet 10 is provided so as to divide at a position substantially corresponding to the opening 2, and so as to substantially cover the first induction coil 3. In other words, configuration is made such that the third ferromagnet divides at a position corresponding to the opening 2 of the open pipe 1, to form a first half 10a that substantially covers half the width direction of the first induction coil 3, and a second half 10b that substantially covers the remaining half of the first induction coil 3.

Regarding the substance of the third ferromagnet 10, similarly to the first and second ferromagnets 9, 9' , ferromagnetic materials may be employed, such as ferrite and laminated magnetic steel sheet, and amorphous alloys.

FIG. 15 and FIG. 16 illustrate an example in which the third ferromagnet 10 is divided into two at the width direction center, and such a case has the advantage of facilitating observation of the state in the vicinity of the join portion 6; however, there is no limitation thereto, and, for example, configuration may be made as a single undivided body. The ferromagnet 10 may also be multi-divided to match the shape of the first induction coil 3.

In the present exemplary embodiment, the reason the third ferromagnet 10 is preferably provided in the vicinity of (above) the first induction coil 3 is that the third ferromagnet 10 utilizes the property of having a magnetic permeability that is several times higher than that of the open pipe 1 and that of the rolls and other structural bodies of the apparatus, to guide magnetic flux generated by the first induction coil 3 to the third ferromagnet 10 having a small magnetic resistance, preventing dissipation of the magnetic flux, and causing the magnetic flux to concentrate in the vicinity of the first induction coil 3. In cases in which the third ferromagnet 10 is not provided, magnetic flux generated by the primary current flowing in the first induction coil 3 flows into the rolls and other structure bodies that are peripheral magnetic members, wastefully consuming the electrical power. In the present exemplary embodiment, providing the third ferromagnet 10 at the back face 3A side of the first induction coil 3 enables the wasteful consumption of useable electric power to be prevented. Consequently, by employing the third ferromagnet 10, the induction current generated in the open pipe 1 is increased by concentrating magnetic flux in the vicinity of the first induction coil 3, raising the current density flowing in the end parts 2a, 2b of the open pipe 1, and enabling the heating efficiency to be raised.

The distance between the third ferromagnet 10 and the first induction coil 3 is preferably as small as possible from the viewpoint of being able to effectively prevent wasteful power consumption, and, specifically, they are preferably disposed apart with a gap of from several mm to several tens of mm such that they do not make contact with each other.

Figure 17:
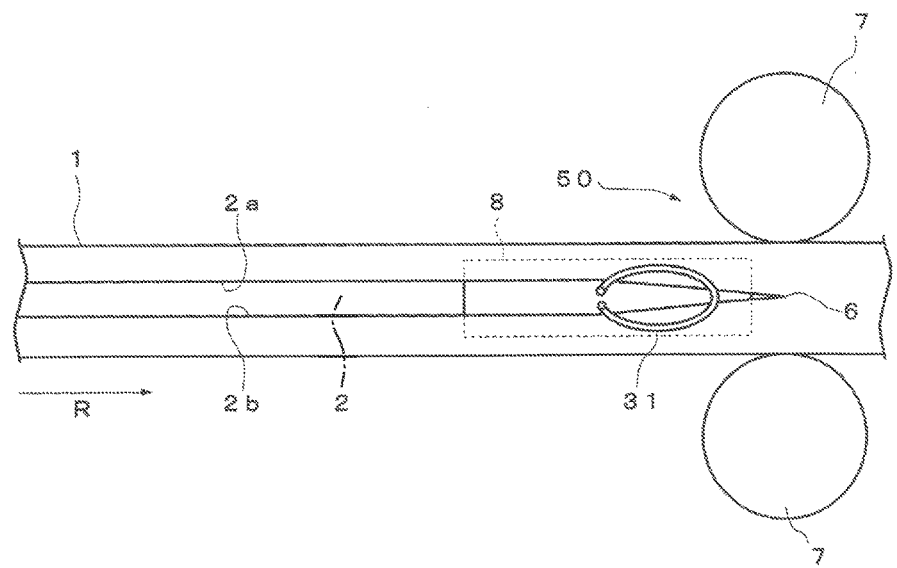
FIG. 17 is a plan view of an example of a placement of an elliptical shaped induction coil, in a schematic diagram to explain a modified example of an electric resistance welded pipe welding apparatus according to the exemplary embodiment of the present invention.
Figure 18:
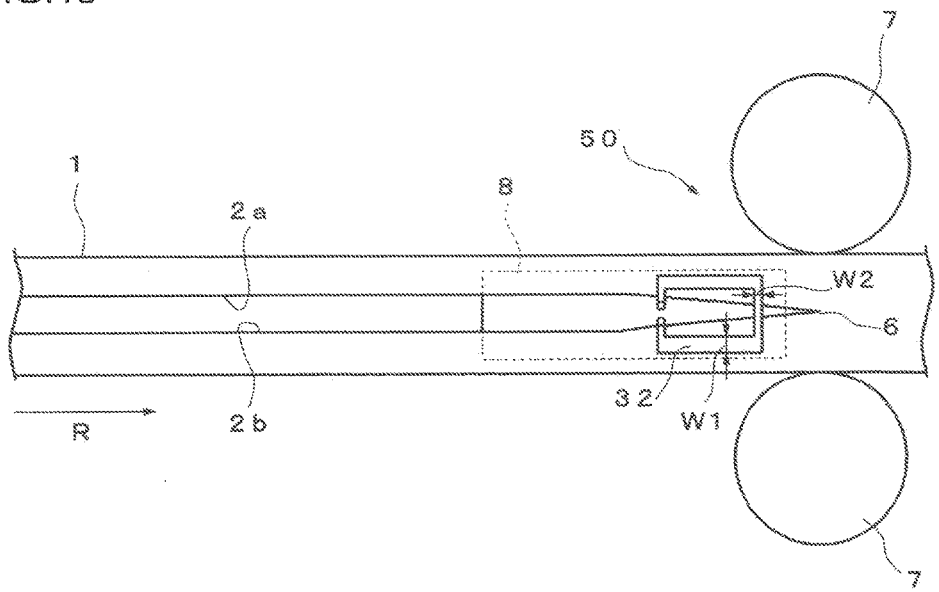
FIG. 18 is a plan view illustrating an example of a rectangular shaped induction coil in which the conductor width at the running direction has been widened, in a schematic diagram to explain a modified example of an electric resistance welded pipe welding apparatus according to the exemplary embodiment of the present invention.

In the present exemplary embodiment, although explanation has been given of cases in which the first induction coil 3 is formed in a rectangular shape such as that illustrated in FIG. 5 and elsewhere, the first induction coil may, for example, be configured with an elliptical shaped induction coil 31 such at that illustrated in FIG. 17. An induction coil 32 may be employed, such as the rectangular shaped first induction coil 32 illustrated in FIG. 18, in which a coil width W1 at an induction coil portion extending along the running direction R of the open pipe 1 is wider than a coil width W2 at an induction coil portion extending in a direction crossing over the opening 2 of the open pipe 1. In cases in which the induction coil 3 has the same widths W1, W2 for the induction coil portions, as illustrated in the example in FIG. 5, due to heating in the open pipe 1 continuing directly below the induction coil portions extending in the running direction R only at the length of those induction coil portions, there is a possibility of this causing the strength of the electric resistance welded pipe to fall, problems with dimensional precision, poor material quality, and the like. The examples illustrated in FIG. 17 and FIG. 18 aim to exhibit a suppressing effect on heat generation in this portion. In the case of FIG. 17, the shape of the first induction coil 31 is elliptical, and shortening the duration of crossing over the first induction coil 31 as the open pipe 1 proceeds enables particular portions of the open pipe 1 to be prevented from reaching a high temperature. In the case of FIG. 18, the current density of the widened portion is lowered by setting a wider width W1 of the induction coil portion in the running direction R, lowering the induction current density generated directly below the portion of the first induction coil 32 extending along the running direction R, and enabling heat generation to be suppressed.

Figure 19:
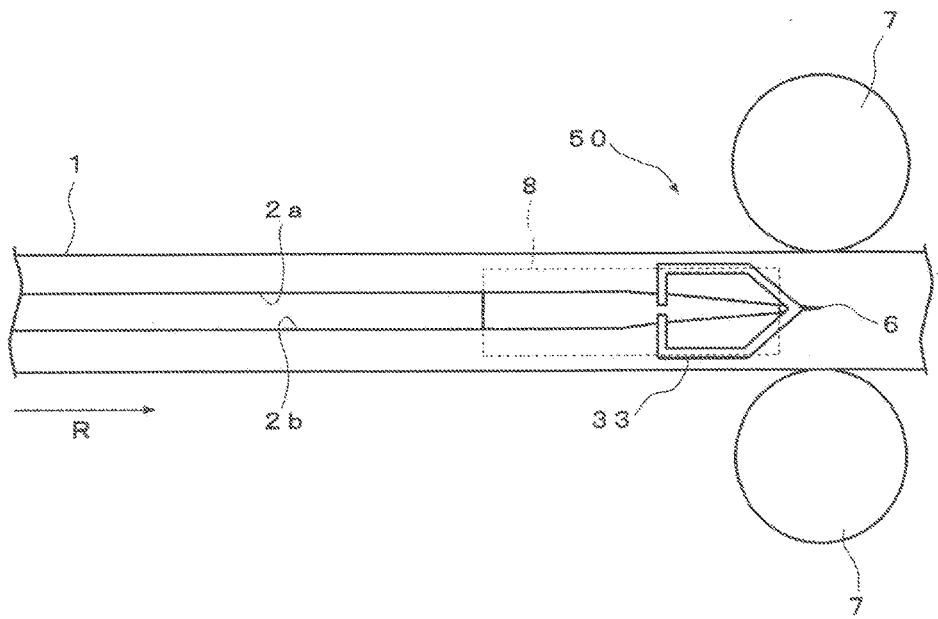
FIG. 19 is a plan view illustrating an example of a first induction coil with a width that narrows at a portion close to the join portion, and that is positioned near to the join portion, in a schematic diagram to explain a modified example of an electric resistance welded pipe welding apparatus according to the exemplary embodiment of the present invention.

As a method to further increase current to the join portion 6, it is also effective to dispose, as the first induction coil, an induction coil 33 formed, as in the example illustrated in FIG. 19, with a taper towards the join portion 6 so as to avoid the squeeze rolls 7 and a top roll, not illustrated in the drawings, provided at an upper portion of the join portion 6. In the example illustrated in FIG. 19, the width of the first induction coil 33 narrows at a portion close to the join portion 6, and these portions are configured to approach the join portion 6. Such a method is also an effective method for manufacturing comparatively small diameter steel pipes.

Figure 20:
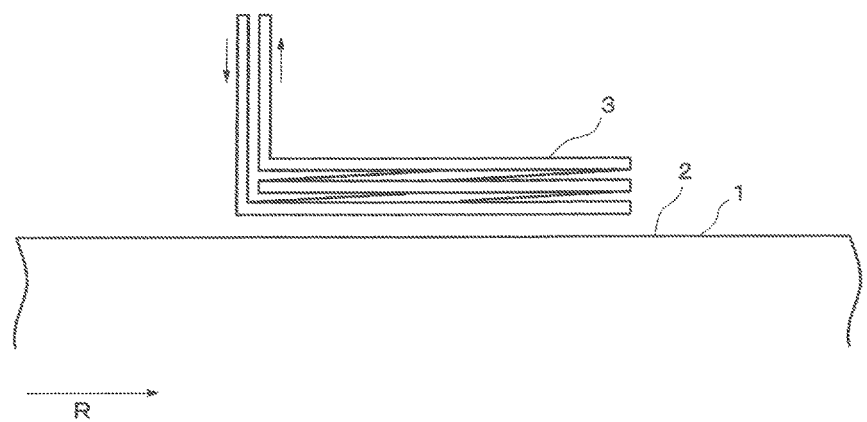
FIG. 20 is a side view to illustrate an example in which a first induction coil is employed with three turns in the height direction, in a schematic diagram to explain a modified example of an electric resistance welded pipe welding apparatus according to the exemplary embodiment of the present invention.
Figure 21:
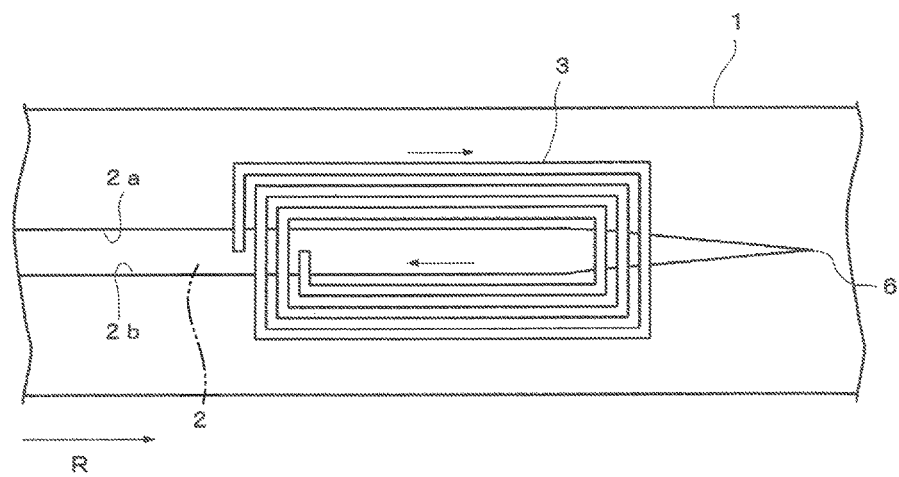
FIG. 21 is a plan view illustrating an example in which a first induction coil is employed with three turns substantially within the same plane, in a schematic diagram to explain a modified example of an electric resistance welded pipe welding apparatus according to the exemplary embodiment of the present invention.

In the examples illustrated in the drawings described above, the number of windings of the first induction coils 3, 31 to 33 is one turn; however, the number of windings of the induction coils 3, 31 to 33 and other induction coils described below may be two turns or more. In consideration thereof, FIG. 20 illustrates an induction coil 3 with three turns as the number of windings in the height direction, and FIG. 21 illustrates an induction coil 3 with three turns as the number of windings within a substantially flat plane. By employing such induction coils using plural turns, the electrical field strength is raised for a given current (the electrical field strength is proportional to the number of windings), thereby enabling supply of power to be concentrated. Conversely, increasing the number of windings enables the current supplied to be smaller whilst obtaining the same electrical field strength. This is accordingly advantageous in enabling the current to be lowered such that the permitted current density of the coil is not reached in cases in which it is not possible to secure sufficient coil cross-sectional area. Moreover, the copper loss can be reduced by lowering the current value.

Figure 22:
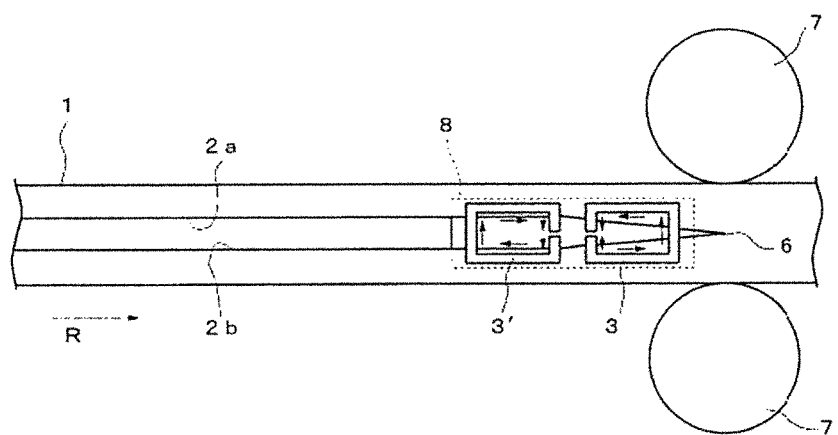
FIG. 22 is a plan view illustrating an example in which a second induction coil of similar configuration to a first induction coil is placed at the upstream side of the first induction coil, in a schematic diagram to explain a modified example of an electric resistance welded pipe welding apparatus according to the first exemplary embodiment of the present invention.

In the present exemplary embodiment, as illustrated in FIG. 22, it is possible to employ a configuration in which, in addition to the first induction coil 3 of the above configuration, a separate induction coil (second induction coil) 3' of a similar configuration is provided in addition at the upstream side.

Figure 23:
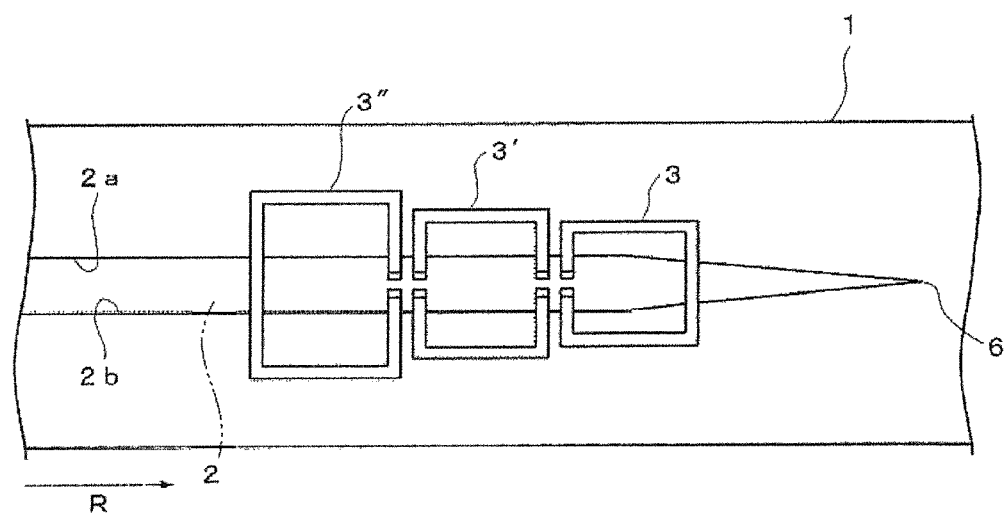
FIG. 23 is a plan view illustrating an example in which a second and a third induction coil of similar configuration to a first induction coil are placed at the upstream side of the first induction coil, in a schematic diagram to explain a modified example of an electric resistance welded pipe welding apparatus according to the exemplary embodiment of the present invention.

It is also possible, as illustrated in FIG. 23, to employ two separate induction coils (second and third induction coils) 3', 3" configured similarly to, and provided at the upstream side of, the first induction coil 3. Enabling branching current flow thereby enables the flowing current value flowing in each of the induction coils to be lowered. This has the advantage of enabling inductance to be adjusted by combining serially connected and parallel connected coils.

Figure 24:
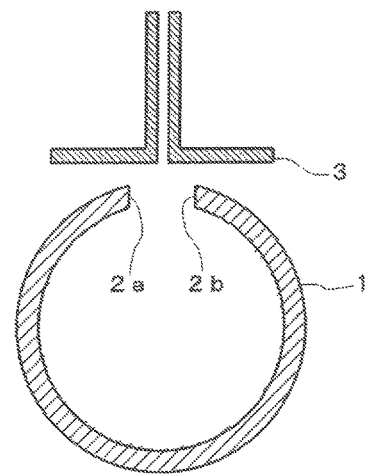
FIG. 24 is a cross-section illustrating an example in which an induction coil extending in a flat plane, as viewed in cross-section orthogonal to the running direction, is employed as a first induction coil, in a schematic diagram to explain a modified example of an electric resistance welded pipe welding apparatus according to the exemplary embodiment of the present invention.

Moreover, in the present exemplary embodiment, as illustrated in FIG. 24, a first induction coil 3 may be employed that is configured with a gap in the open pipe 1 that gradually widens with distance from the opening 2 of the open pipe 1, by forming the first induction coil 3 in a substantially flat plane shape as viewed in cross-section orthogonal to the running direction R. Adopting such a configuration obtains the following advantages. Namely, forming the first induction coil 3 in a shape that curves along the outer face of the open pipe 1, as illustrated in FIG. 7 and FIG. 16, concentrates heating at the portion of the open pipe 1 directly below the first induction coil 3, raising the temperature, and leading to a concern that a lowering of mechanical strength or deformation of such a portion might develop, whereas in contrast thereto, forming the first induction coil 3 such that the distance to the open pipe 1 widens on moving away from the opening 2 of the open pipe 1 alleviates concentration of current at side portions of the open pipe 1 corresponding to the portions of the first induction coil 3 that extend in the running direction R, enabling localized heating of these side portions to be avoided. Moreover, by forming the first induction coil 3 in such a shape, even if the diameter of the open pipe 1 to be welded changes, there is no need to change the coil for each steel pipe size, enabling the same size of induction coil to be put to greater use, and enabling a reduction in facility cost. Moreover, the amount of effort required to exchange induction coils is reduced even when the steel pipe size changes, with the advantage of raising productivity.

Second Exemplary Embodiment

Explanation follows regarding an electric resistance welded pipe welding apparatus according to a second exemplary embodiment of the present invention.

Figure 25:
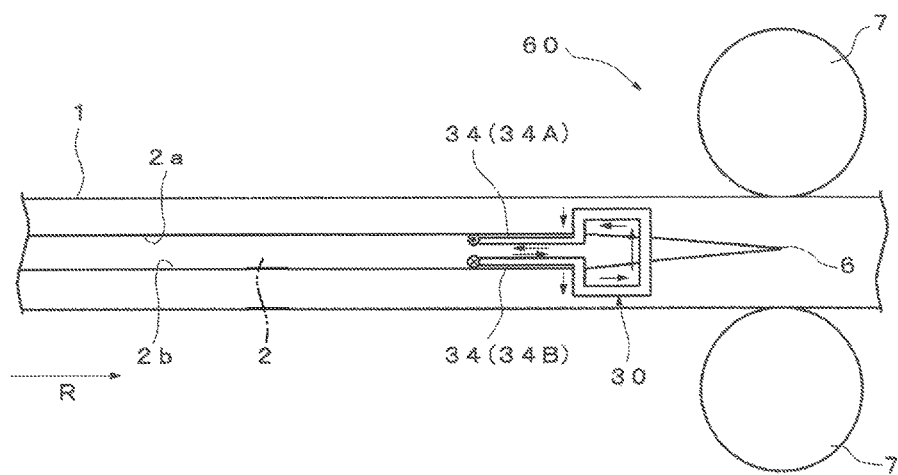
FIG. 25 is a plan view illustrating an example of a conductor connected to a first induction coil disposed inside an opening of an open pipe at the upstream side of the first induction coil disposed above the open pipe, in a schematic diagram to explain an electric resistance welded pipe welding apparatus according to another exemplary embodiment of the present invention.
Figure 26:
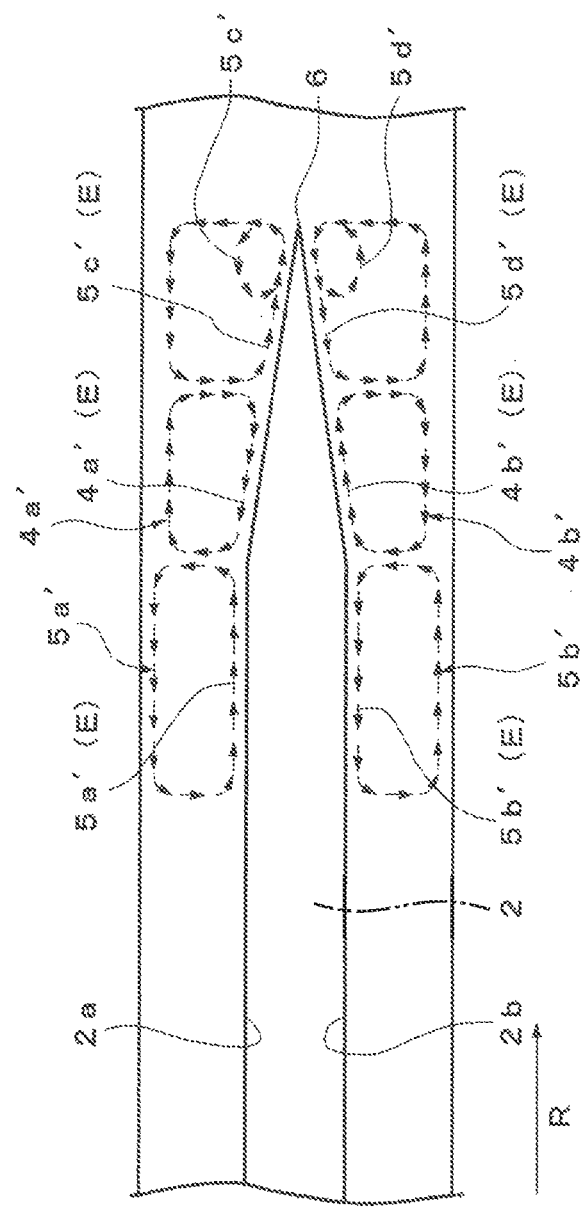
FIG. 26 is a plan view illustrating the main current flow of secondary induction current induced in an open pipe when a primary current flows in the first induction coil and conductor illustrated in FIG. 25, in a schematic diagram to explain an electric resistance welded pipe welding apparatus according to the other exemplary embodiment of the present invention.

FIG. 25 is a schematic plan view illustrating an electric resistance welded pipe welding apparatus 60 of the second exemplary embodiment of the present invention. FIG. 26 is a plan view schematically illustrating a distribution of induction current generated during electric resistance welded pipe welding using the electric resistance welded pipe welding apparatus 60 illustrated in FIG. 25.

In the first exemplary embodiment described above, explanation has been given of an example in which induction current is suppressed from flowing to the upstream side of the first induction coil 3 by disposing the first ferromagnet 9 at the upstream side of the first induction coil 3. However, the present exemplary embodiment adopts a configuration in which induction current is similarly suppressed at the upstream side by providing a conductor in which a primary current flows at the upstream side of the first induction coil 3, amplifying current to the join portion 6, and raising the heating efficiency. Detailed explanation thereof follows. In the present exemplary embodiment, configuration similar to that of the first exemplary embodiment is appended with the same reference numerals and detailed explanation thereof is omitted.

As illustrated in FIG. 25, in the electric resistance welded pipe welding apparatus 60 of the present exemplary embodiment, as viewed along the running direction R of the open pipe 1, a conductor 34, including two conductor sections 34A, 34B extending in straight lines along the two end parts 2a, 2b of the open pipe 1, is provided to the upstream side of a first induction coil 30. Each of the conductor sections 34A, 34B is provided separated from the end faces of the two end parts 2a, 2b of the open pipe and facing towards the end faces. In the example illustrated in FIG. 25, the first induction coil 30 positioned at the downstream side, and the conductor sections 34A, 34B of the conductor 34 positioned at the upstream side, are integrated together, namely are electrically connected together so as to conduct between each other. A primary current supplied to the first induction coil 30 accordingly flows through the conductor sections 34A, 34B.

Thus an induction current such as that schematically illustrated in FIG. 26 is generated in the open pipe 1 by providing the conductor 34 with the two conductor sections 34A, 34B at the upstream side of, and in addition to, the first induction coil 30. More specifically, at positions of the open pipe 1 corresponding to the first induction coil 30, the primary current flowing in the first induction coil 30 forms loops of induction currents $4a'$, $4b'$ in the opposite direction to the primary current of the first induction coil 30. Moreover, due to the primary current flowing in each of the conductor sections 34A, 34B, induction currents $5a'(E)$, $5b'(E)$ are generated in the opposite direction to the primary current of the conductor sections 34A, 34B at the end parts 2a, 2b of the open pipe 1, facing the conductor sections 34A, 34B, and forming loops of induction currents $5a'$, $5b'$. Namely, the induction currents $5a'(E)$, $5b'(E)$ passing along the end parts 2a, 2b of the open pipe 1 in the closed circuits (loops) $5a'$, $5b'$ of secondary current (induction current) formed corresponding to the conductor sections 34A, 34B, flow in the opposite direction to induction currents $4a'(E)$, $4b'(E)$ passing along the end parts 2a, 2b of the open pipe 1 in the closed circuits (loops) 4a', 4b' of secondary current (induction current) formed corresponding to the first induction coil 30.

Such induction currents 5a', 5b' have a higher current density than the induction currents 5a, 5b illustrated in FIG. 6, by the additional amount of the induction currents generated by the conductor sections 34A, 34B. Thus the flow in the induction currents 5a'(E), 5b'(E) suppress or substantially cancel out the flow of the induction currents 4a'(E), 4b'(E) in the two end parts 2a, 2b of the open pipe 1 flowing in the opposite direction, and the induction current is amplified for the induction currents 4a', 4b' flowing to the opposite side to the side of the end parts 2a, 2b. The loops of induction currents 5c', 5d' towards the join portion 6 are amplified by this amplified induction current, and high current density induction currents 5c'(E), 5d'(E) flow toward the join portion 6 side from the two end parts 2a, 2b. Thereby in the vicinity of the join portion 6, current is further concentrated by the proximity effect of the high frequency current, resulting in a further rise in the heating efficiency. This effect is particularly significant in cases in which the gap of the two end parts 2a, 2b of the open pipe 1 is from approximately 20 mm to approximately 30 mm.

Figure 27:
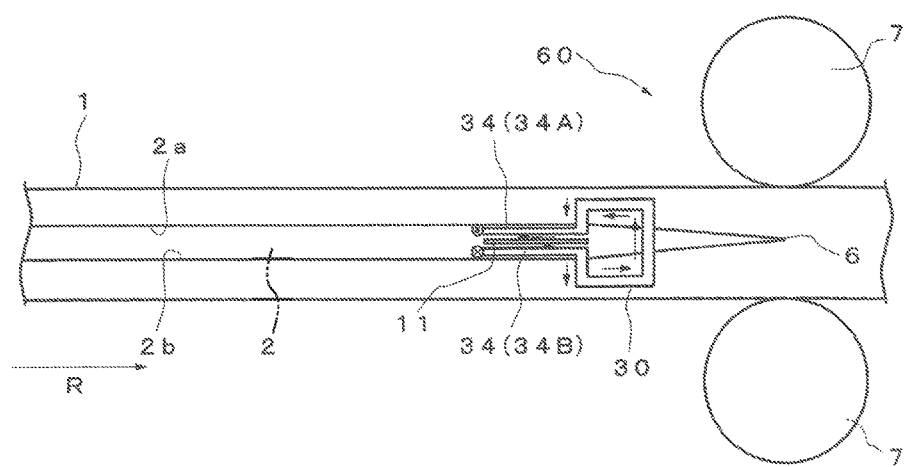
FIG. 27 is plan view illustrating an example of a fourth ferromagnet placed between conductors forming the conductor section illustrated in FIG. 25, in a schematic diagram to explain an electric resistance welded pipe welding apparatus according to the other exemplary embodiment of the present invention.

However, in cases in which the gap between the two end parts 2a, 2b of the open pipe 1 is small, namely the opening 2 is narrow, the respective gaps between the end parts 2a, 2b and the conductor sections 34A, 34B are narrow, and the impedance between the conductor section 34A and the conductor section 34B is smaller than the impedance between the two end parts 2a, 2b and the conductor sections 34A, 34B. When such a situation occurs, sometimes the primary current flowing in the outside portion of the conductor sections 34A, 34B (the portion on the end parts 2a, 2b side of the conductor sections 34A, 34B) branches so as to give a flow at an inside portion of the conductor sections 34A, 34B (a portion facing toward the other out of the conductor sections 34A, 34B), reducing the induction currents 5a'(E), 5b'(E). Thus in the present exemplary embodiment, as illustrated in FIG. 27, a ferromagnet (fourth ferromagnet) 11 is preferably provided to increase the impedance between the conductor sections 34A, 34B. More specifically, as in the illustrated examples, the fourth ferromagnet 11 is disposed between the conductor sections 34A, 34B and electrically insulated from the conductor sections 34A, 34B. The impedance between the conductor sections 34A, 34B can be raised by providing the fourth ferromagnet 11, obtaining an action that makes current flow to the outside portions described above, so as to flow to the inside portions described above of the conductor sections 34A, 34B. Moreover, due to the fourth ferromagnet 11 having high magnetic permeability, the magnetic flux due to the primary current flowing in the outside portions of the conductor sections 34A, 34B can be concentrated at the end parts 2a, 2b facing the conductor sections 34A, 34B, thereby obtaining an effect in which the induction currents 5a', 5b' efficiently flow at the two end parts 2a, 2b, and raise the heating efficiency.

Figure 28:
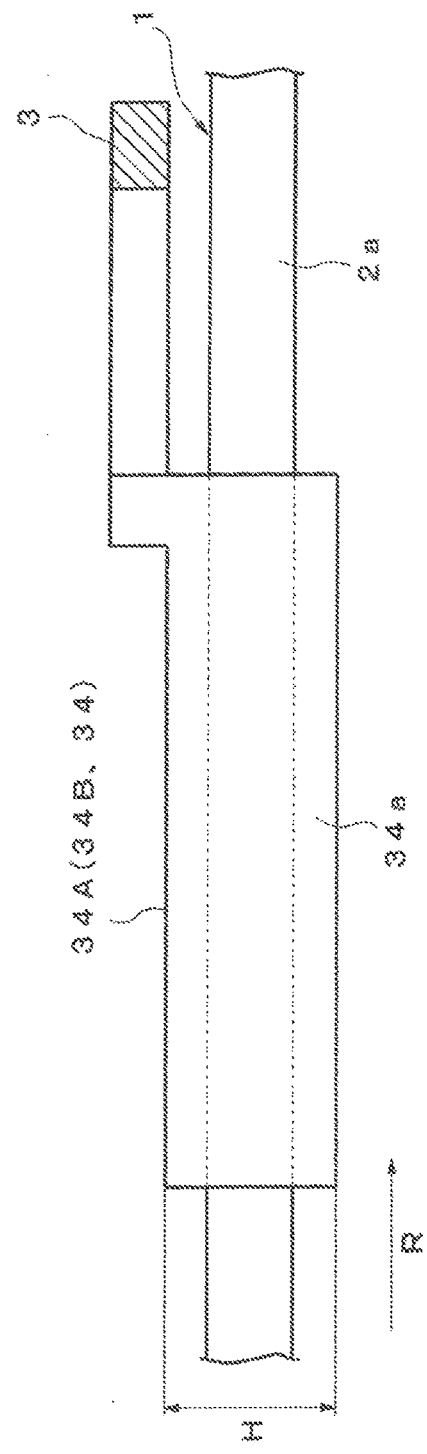
FIG. 28 is a side view cross-section illustrating positional relationships to the two end parts in a case in which a conductor is placed in an opening of an open pipe, in a schematic diagram to explain an electric resistance welded pipe welding apparatus according to the other exemplary embodiment of the present invention.
Figure 29:
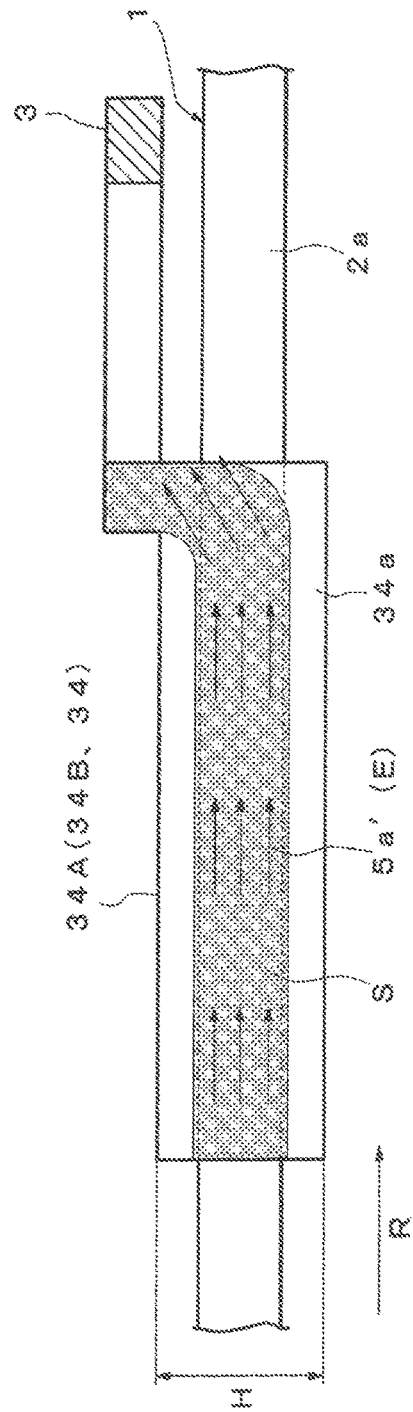
FIG. 29 is a cross-section from the side illustrating current flow when a primary current is passing through the conductor of FIG. 28, in a schematic diagram to explain an electric resistance welded pipe welding apparatus according to the other exemplary embodiment of the present invention.

Note that, as in the examples illustrated in FIG. 28 and FIG. 29, a height dimension H of the conductor sections 34A, 34B is preferably slightly larger than the maximum plate thickness of the open pipe 1 (for convenience, only the one end part 2a and conductor section 34A are illustrated in FIG. 28 and FIG. 29). Moreover, the height dimension H of the conductor sections 34A, 34B is a dimension such that the conductor sections 34A, 34B jut out past the outer face and the inner face of the open pipe 1. When primary current flows in the thus configured conductor sections 34A, 34B, the induction currents 5a'(E), 5b'(E) such as those illustrated by the arrows in FIG. 29 flow in each of the end parts 2a, 2b of the open pipe 1 (for convenience, only the one end part 2a and induction current 5a'(E) are illustrated in FIG. 29). In such cases, the space portion between the primary current flowing in the conductor sections 34A, 34B and the induction currents 5a'(E), 5b'(E) acts as inductance, and the primary current flowing in the conductor sections 34A, 34B flows along the portion with symbol S illustrated with shading in FIG. 29 facing the induction currents 5a'(E), 5b'(E) generated in the two end parts 2a, 2b in order to reduce the inductance in the induction coil 34. The current density in the two end parts 2a, 2b is accordingly raised, obtaining an effect of improving the heating efficiency.

In the conductor sections 34A, 34B illustrated in FIG. 28, regarding a region of a lower portion 34a jutting out to the inner face side of the open pipe 1, sufficient effect is achievable in the present exemplary embodiment without this portion. However, setting the height dimension H of the conductor sections 34A, 34B so as to jut out from the outer face and the inner face of the open pipe 1, as in the example illustrated, saves the labor for changing over the conductor 34 when manufacturing electric resistance welded pipe of a different specification, such as different plate thicknesses or the like of the open pipe 1, leading to improvements in manufacturability and productivity. The height dimension H of the conductor sections 34A, 34B may be smaller than the maximum plate thickness of the open pipe 1; however, heating efficiency is lower in such cases.

As the fourth ferromagnet 11, similarly to each of the ferromagnets described above, ferromagnetic materials with a low electrical conductivity, such as ferrite and magnetic steel sheet, and amorphous materials, may be employed, and may be designed such that magnetic flux saturation does not occur. In cases in which the magnetic flux density is high, and heat generation in the fourth ferromagnet 11 cannot be ignored, a method may, for example, be adopted of supplying cooling water to cool the fourth ferromagnet 11, or cooling with a gas, such as air, or a coolant of mixed gas and liquid.

Figure 30:
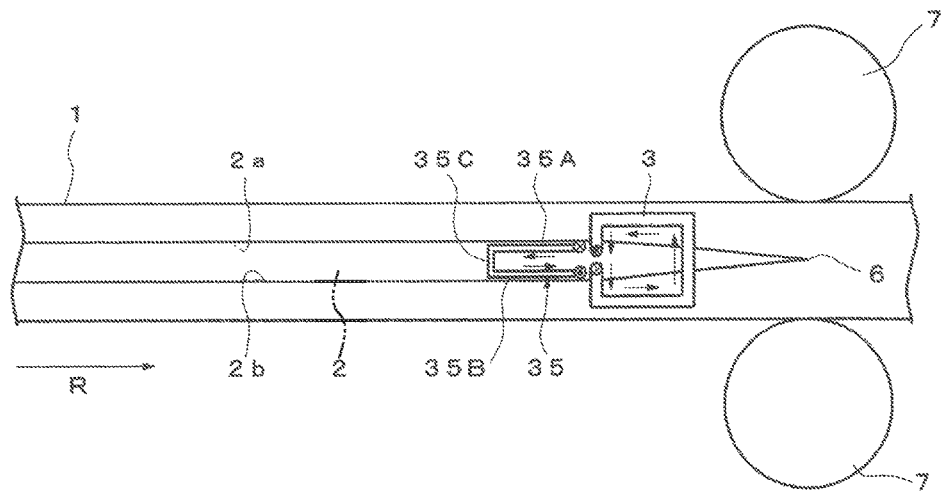
FIG. 30 is a plan view illustrating an example in which a conductor is placed between the two end parts of an open pipe on the upstream side of a first induction coil, and is electrically insulated from the first induction coil, in a schematic diagram to explain an electric resistance welded pipe welding apparatus according to the other exemplary embodiment of the present invention.

Note that although an example has been illustrated in FIG. 25 to FIG. 29 in which the first induction coil 30 and the conductor 34 are formed as a single body, in a modified example of the present exemplary embodiment, configuration may be made, as illustrated in FIG. 30, with a first induction coil 3 and a conductor 35 that are loop shaped, such that they are not electrically connected together. In the example of FIG. 30, the conductor 35 includes two conductor sections 35A, 35B that extend in a straight line shapes facing the end parts 2a, 2b of the open pipe 1, and a conductor section 35C that connects together the two conductor sections, so as to form a substantially U-shape in plan view. In such cases, the currents (see the arrow in the drawings) supplied from the power source, not illustrated in the drawings, may pass through in opposite directions to each other. In such a configuration, supplied current is caused to branch in flow to the first induction coil 3 and the conductor 35, enabling the current density of the first induction coil 3 to be lowered, and thereby enabling an effective suppression of heat generation to be obtained.

Figure 31:
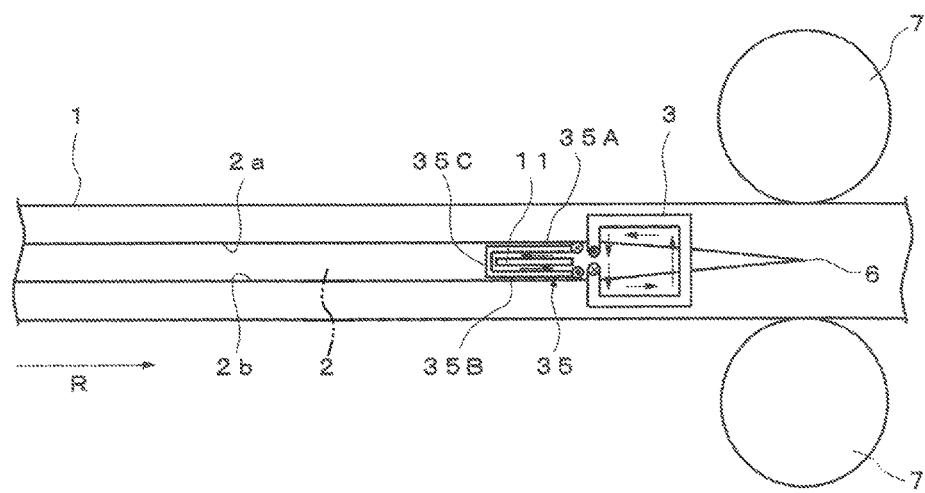
FIG. 31 is a plan view illustrating an example in which a fourth ferromagnet is placed between conductor sections forming the conductor illustrated in FIG. 30, in a schematic diagram to explain an electric resistance welded pipe welding apparatus according to the other exemplary embodiment of the present invention.

Moreover, similarly to in FIG. 27 to FIG. 29, as in the example illustrated in FIG. 31, a configuration may be adopted in which a fourth ferromagnet 11 is disposed between the conductor sections 35A, 35B of the conductor 35.

Figure 32:
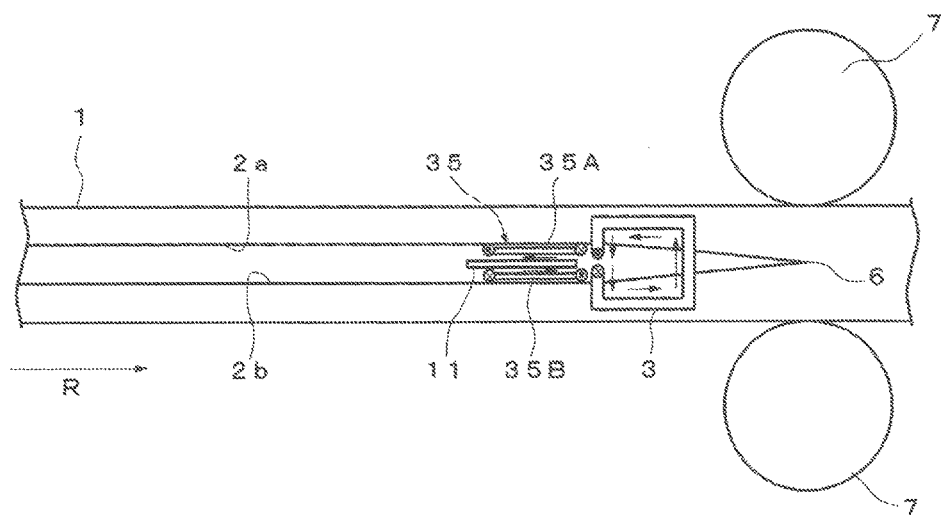
FIG. 32 is a plan view of an example in which the conductor illustrated in FIG. 31 is configured from 2 parallel conductor sections at two end parts of an open pipe, in a schematic diagram to explain an electric resistance welded pipe welding apparatus according to the other exemplary embodiment of the present invention.

Moreover, in the present exemplary embodiment, as illustrated in FIG. 32, a configuration may be adopted combining a loop shaped first induction coil 3, with a conductor 35 having two mutually separated conductor sections 35A, 35B. In cases in which, as illustrated in FIG. 30 and FIG. 31, the conductor sections 35A, 35B are connected together in series, sometimes the current density inside the conductor 35 becomes too high; however, as in the example of FIG. 32, by adopting a configuration in which the conductor 35 is divided into the conductor section 35A and the conductor section 35B, heat generation in the conductor sections 35A, 35B may be suppressed by the current density of each of the conductor sections 35A, 35B being lowered by a specific branched flow of primary current.

Note that it is preferable that the fourth ferromagnet 11 is set with a vertical dimension at least 10 mm or greater than that of the conductor sections 35A, 35B, and with a width that is as large as possible, and that includes an insulating material, described below, between the fourth ferromagnet 11 and the adjacent conductor sections 35A, 35B. It is sufficient for the length in the running direction R of the fourth ferromagnet 11 to be equivalent to, or longer than, the length of the facing conductor sections 35A, 35B.

Moreover, as illustrated in FIG. 32, cases in which the fourth ferromagnet 11 is disposed between the conductor sections 35A, 35B forming the conductor 35 are preferable from the viewpoint of further raising the heating efficiency.

In cases in which a material with slight electrical conductivity is employed as the fourth ferromagnet 11, such as ferrite, since the generation of sparks and damage is anticipated if the conductor sections 35A, 35B configured as described above make contact, a configuration may be adopted in which the surfaces thereof are covered with an insulating material, or insulated across an air layer if it is not possible to cover with an insulating material.

Figure 33:
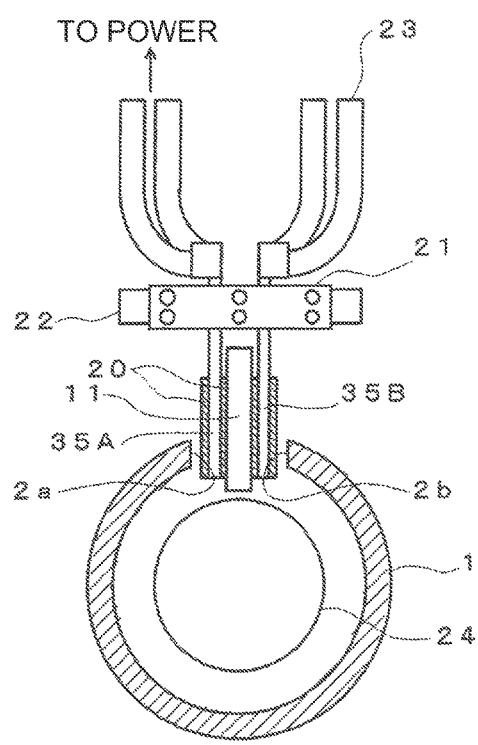
FIG. 33 is a vertical cross-section illustrating an example of a support structure in a case in which a fourth ferromagnet is placed between the conductor sections forming the conductor of FIG. 32, in a schematic diagram to explain an electric resistance welded pipe welding apparatus according to the other exemplary embodiment of the present invention.

In the example illustrated in FIG. 33, the conductor sections 35A, 35B and the fourth ferromagnet 11 are assembled on either side of insulation plates 20, and the conductor sections 35A, 35B are movably attached to a linear guide 22 formed from an insulating resin, ceramic, or the like using conductor section holder plates 21. Due to adopting such a configuration, even if the conductor sections 35A, 35B and the end parts 2a, 2b of the open pipe 1 make contact during electric resistance welding, the conductor sections 35A, 35B and the fourth ferromagnet 11 assembled on either side of the insulation plates 20 are able to move in the left-right direction of the drawing, enabling damage to the conductor sections 35A, 35B to be prevented. Moreover, in cases in which such a configuration is adopted, connection lines 23, not illustrated in the drawings, between a power device and the conductor sections 35A, 35B are preferably configured from movable braded wire.

Third Exemplary Embodiment

Explanation follows regarding an electric resistance welded pipe welding apparatus according to a third exemplary embodiment of the present invention.

Figure 34:
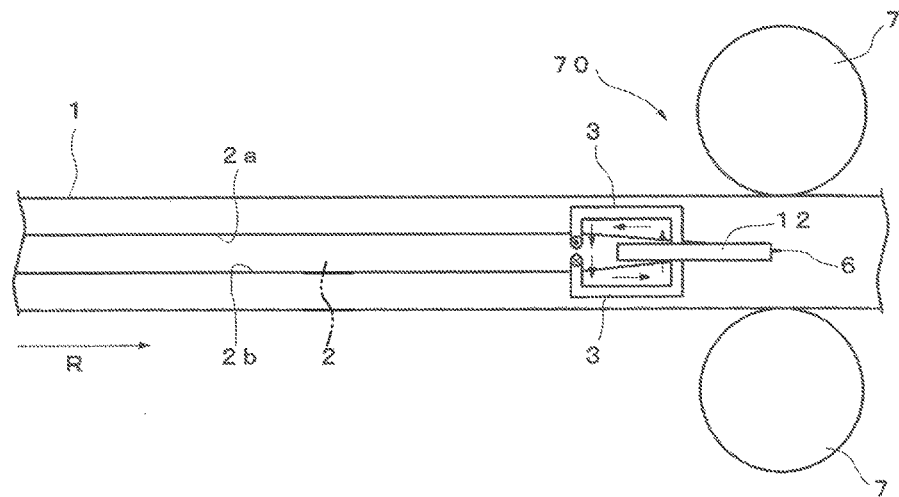
FIG. 34 is a plan view illustrating an example in which a fifth ferromagnet is inserted into first induction coil and an opening of an open pipe, in a schematic diagram to explain an electric resistance welded pipe welding apparatus according to another exemplary embodiment of the present invention.
Figure 35:
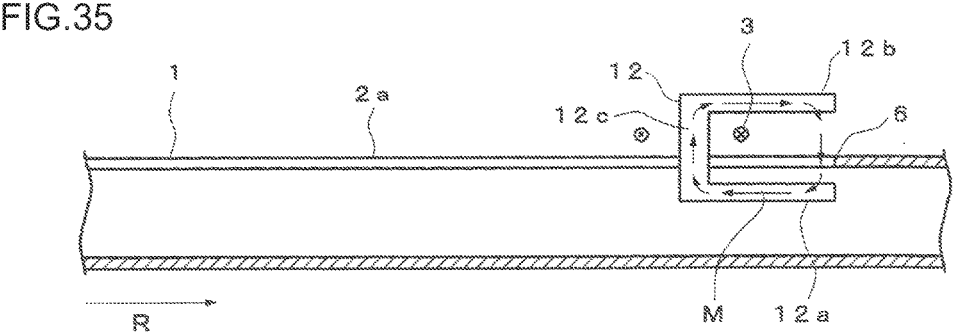
FIG. 35 is a side view cross-section of an example in which a fifth ferromagnet is inserted into the first induction coil and the opening of the open pipe illustrated in FIG. 34, in a schematic diagram to explain an electric resistance welded pipe welding apparatus according to the other exemplary embodiment of the present invention.

FIG. 34 is a schematic plan view illustrating an electric resistance welded pipe welding apparatus 70 of the third exemplary embodiment of the present invention, and FIG. 35 is a schematic side view cross-section to explain the magnetic flux direction when magnetic flux M generated by a first induction coil 3 during electric resistance welded pipe welding using the electric resistance welded pipe welding apparatus 70 illustrated in FIG. 34 passes through a ferromagnet (a fifth ferromagnet) 12.

In the present exemplary embodiment, in contrast to in the first and second exemplary embodiments described above, a configuration is adopted such as the example described below in order to further raise the induction heating efficiency. In the present exemplary embodiment, the same reference numerals are appended to configuration similar to that of the first and second exemplary embodiments, and detailed explanation is omitted thereof.

As illustrated in FIG. 34, the electric resistance welded pipe welding apparatus 70 of the present exemplary embodiment has a fifth ferromagnet 12 disposed so as to be inserted into space surrounded by the first induction coil 3 and into the opening 2. The fifth ferromagnet 12 includes an inside section 12a that extends in the running direction R and is disposed at the inside of the open pipe 1, an outside section 12b that extends in the running direction R and is disposed at the outside of the open pipe 1, and a center section 12c that extends in the inside-outside direction of the open pipe 1 (the vertical direction in the drawings) between the inside section 12a and the outside section 12b. The fifth ferromagnet 12 extends further to the downstream side of the join portion (weld portion) 6 side than the first induction coil 3, and is disposed so as to straddle the first induction coil 3 and the opening 2. The fifth ferromagnet 12 is configured with a sideways facing square-cornered U-shaped cross-section, or a sideways facing U-shaped cross-section as viewed from the side face with respect to the running direction R of the open pipe 1 (a sideways facing square-cornered U-shape in the example illustrated in FIG. 34 and FIG. 35). The fifth ferromagnet 12 may also be an H-shape turned on its side or a h-shape turned on its side. In the example of FIG. 34 and FIG. 35, the cross-section of the ferromagnet 12 is a sideways facing square-cornered U-shape, with the open (the open space) side thereof facing toward the downstream side in the running direction R of the open pipe 1, and is disposed so as to span between a space above a downstream portion of a primary current circuit, a space between an upstream portion of the primary current circuit and the downstream portion thereof, and an inside pipe space below the join portion 6. Preferably the leading end portions (the downstream side end portions) of the inside section 12a and the outside section 12b of the fifth ferromagnet 12 extend as far as the vicinity of the join portion 6. The thickness of the fifth ferromagnet 12 is preferably a thickness such that magnetic flux saturation does not occur, or thicker, and also needs to be suppressed to a thickness that does not cause contact with the squeeze rolls 7 or the like.

As in the example illustrated in FIG. 34, the electric resistance welded pipe welding apparatus 70 of the present exemplary embodiment, similarly to the electric resistance welded pipe welding apparatus 50 illustrated in the example of FIG. 5 and FIG. 6, has a primary current that passes through the first induction coil 3 (see arrows in FIG. 34). When this occurs, as illustrated in FIG. 35, the magnetic flux M generated by the first induction coil 3 passes through the fifth ferromagnet 12 extending to the join portion (weld portion) 6 side so as to straddle the first induction coil 3, generating induction current passing in the vicinity of the two end parts 2a, 2b facing across the opening 2. The magnetic flux M passing through the open pipe 1, as illustrated by the arrows in FIG. 35, forms a magnetic circuit in the fifth ferromagnet 12, including an inside section 12a disposed inside the open pipe 1, an outside section 12b disposed outside the pipe, and a center section 12c, that connects together the pipe inside and outside. The fifth ferromagnet 12 is effective at drawing in the magnetic flux M diverging from the first induction coil 3 due to being formed from a material with high magnetic permeability, enabling the magnetic flux M to efficiently pass through the two end parts 2a, 2b of the open pipe 1 at the join portion 6 side, and enabling an induction current to be generated efficiently.

Figure 36:
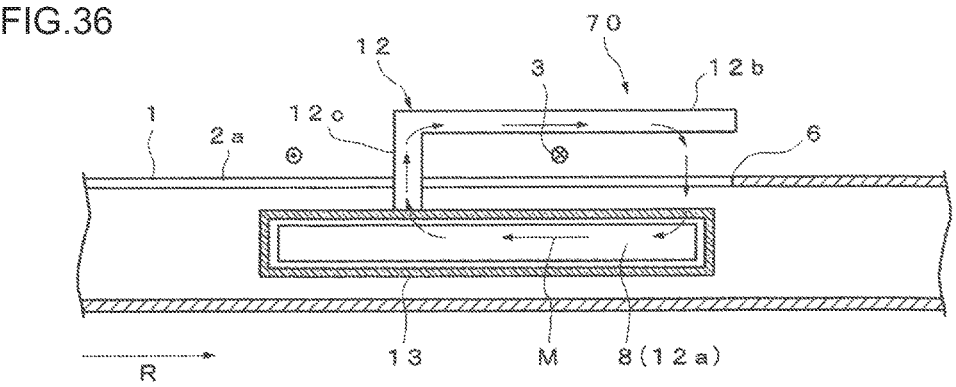
FIG. 36 is a side view cross-section illustrating a modified example in which an impeder placed inside an open pipe is employed as an inside section of a fifth ferromagnet, in a schematic diagram to explain an electric resistance welded pipe welding apparatus according to the other exemplary embodiment of the present invention.

Although the fifth ferromagnet 12 is configured from the inside section 12a, the outside section 12b, and the center section 12c that are all integrated together in the example of FIG. 34 and FIG. 35, these may be configured as separate bodies. In cases in which the inside section 12a, the outside section 12b, and the center section 12c are configured as separate bodies, directly connecting the inside section 12a, the outside section 12b, and the center section 12c together is unnecessary, and they may be separated from each other, and other members may be interposed therebetween, as long as the closed circuit of the magnetic flux M is formed as described above. For example, as illustrated in FIG. 36, in cases in which an impeder 8 extending in the running direction R is disposed inside the open pipe 1, the impeder 8 may be employed in place of the inside section 12a of the fifth ferromagnet 12. In the example in FIG. 36, an impeder 8 is housed inside an impeder case 13, and the center section 12c is not directly connected to the impeder 8 functioning as the inside section 12a; however, the magnetic flux M still forms a closed circuit.

Figure 37:
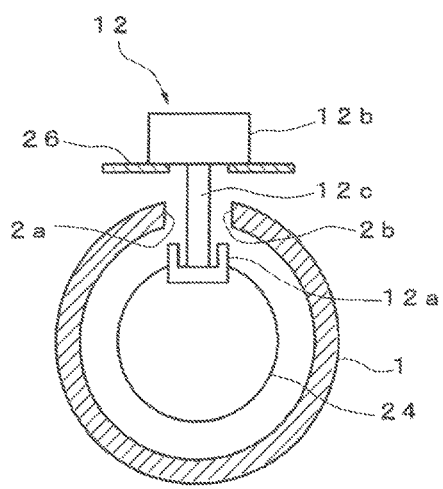
FIG. 37 is a cross-section illustrating an example of a support structure for the fifth ferromagnet in FIG. 34 and FIG. 35, in a schematic diagram to explain an electric resistance welded pipe welding apparatus according to the other exemplary embodiment of the present invention.

Explanation next follows regarding an example of a support structure illustrated in FIG. 37 for the fifth ferromagnet 12 configured as described above. In the example illustrated, the outside section 12b and the center section 12c of the fifth ferromagnet 12 are either formed as a single body, or fixed to each other, and the inside section 12a is formed as a separate body thereto. During assembly of the fifth ferromagnet 12, first the inside section 12a of the fifth ferromagnet 12 is attached to a mandrel 24 placed in the vicinity of the pipe inside center. Then, after the first induction coil 3 (see FIG. 34) has been set above the opening 2 of the open pipe 1, the outside section 12b is mounted onto a stand 26 disposed above the opening 2. A state is thereby achieved in which the fifth ferromagnet 12 is movably supported by suspension. At this stage, a lower end of the center section 12c integrally formed to the outside section 12b makes contact with an inside face of an indented portion inner face formed to the top face of the inside section 12a. Adopting such a configuration enables damage to the fifth ferromagnet 12, and large flaws to the two end parts 2a, 2b of the open pipe 1 to be prevented from occurring even when a portion of the fifth ferromagnet 12 makes contact with the two end parts 2a, 2b of the open pipe 1, due to the fifth ferromagnet 12 being movable. Moreover, in the fifth ferromagnet 12, the center section 12c that has a possibility of making contact with the two end parts 2a, 2b of the open pipe 1 is preferably protected by an insulating material, such as glass tape or baking plate, from the viewpoints of enabling damage to the apparatus to be prevented, and enabling sparks to be prevented from occurring. In the present exemplary embodiment, explanation has been given of an example of an embodiment in which the fifth ferromagnet 12 is divided in consideration of the ease of installation. However the fifth ferromagnet 12 may, for example, be configured as a single body with a sideways facing square-cornered U-shaped cross-section and, similarly to in the above example, employed by mounting to the stand 26.

Figure 38:
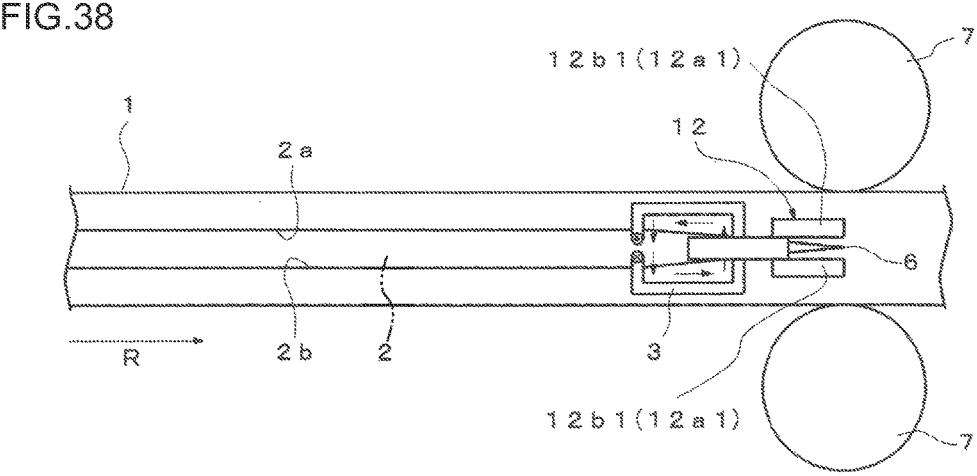
FIG. 38 is a plan view illustrating an example of a fifth ferromagnet with a branched shape including downstream side end portions of an outside section and an inside section, so as to be inserted into the first induction coil and the opening of the open pipe, in a schematic diagram to explain an electric resistance welded pipe welding apparatus according to the other exemplary embodiment of the present invention.

Moreover, in the present exemplary embodiment, as illustrated in FIG. 38, the fifth ferromagnet core 12 may be formed such that, in plan view, at least one of the inside section 12a or the outside section 12b is divided at the vicinity of the join portion 6 so as to divide toward the outside of the vicinity of the two end parts 2a, 2b of the open pipe 1. Namely, at least one of the inside section 12a or the outside section 12b of the fifth ferromagnet 12 may be formed in a branched shape (substantially V-shaped, substantially U-shaped, or the like) at downstream side end portions 12a1, 12b1, bifurcating so as to avoid the join portion 6. Moreover, preferably both the inside section 12a and the outside section 12b are formed in a branched shape bifurcating at the downstream side end portions 12a1, 12b1.

The reason it is preferable to adopt the shape described above is that branching the end portion 12b1 at the downstream side of the outside section 12b of the fifth ferromagnet 12 is an example in which observation from above the state of the join portion (weld portion) 6, using a monitor or the like, is facilitated. Branching the downstream side end portion 12a1 of the inside section 12a of the fifth ferromagnet 12 enables concerns to be reduced regarding damage to the inside section 12a from molten metal contacting the inside section 12a of the fifth ferromagnet 12 in cases in which molten metal in the vicinity of the join portion 6 is discharged by electromotive force generated by induction current and falling inside the pipe. The discharged molten metal also sometimes flies off in the pipe upwards direction; however, in such cases also, the direct contact of the molten metal with the outside section 12b can be suppressed by branching the downstream side end portion 12b 1 of the outside section 12b of the fifth ferromagnet 12, with the effect that damage to the outside section 12b is also reduced.

In the present exemplary embodiment, as in the example illustrated in FIG. 38, downstream side end portions 12a1, 12b1 branch toward the two outsides in the vicinity of the two end parts 2a, 2b at both the inside section 12a and the outside section 12b of the fifth ferromagnet 12, in a shape that is disposed at a position slightly away from the opening 2 of the open pipe 1. Falling of weld metal onto the inside section 12a of the fifth ferromagnet 12, and build up thereon, is thereby suppressed from occurring, enabling visual confirmation of the state of the join portion 6. It is accordingly possible to continue to maintain stable performance due to being able to prevent a drop in the magnetic function of the fifth ferromagnet 12, and it is also possible to constantly monitor the state of the weld portion during the process.

Figure 39:
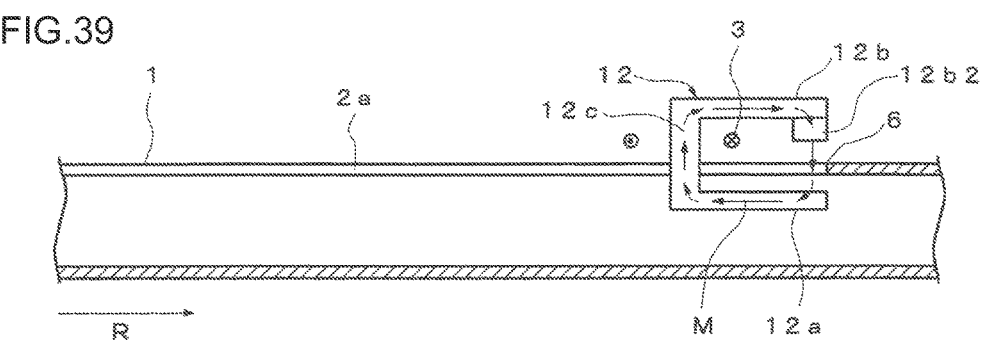
FIG. 39 is a side view cross-section illustrating an example of a jutting out portion that is provided at a downstream side end portion of an outside section of a fifth ferromagnet and projects toward an inside section thereof, in a schematic diagram to explain an electric resistance welded pipe welding apparatus according to the other exemplary embodiment of the present invention.
Figure 40:
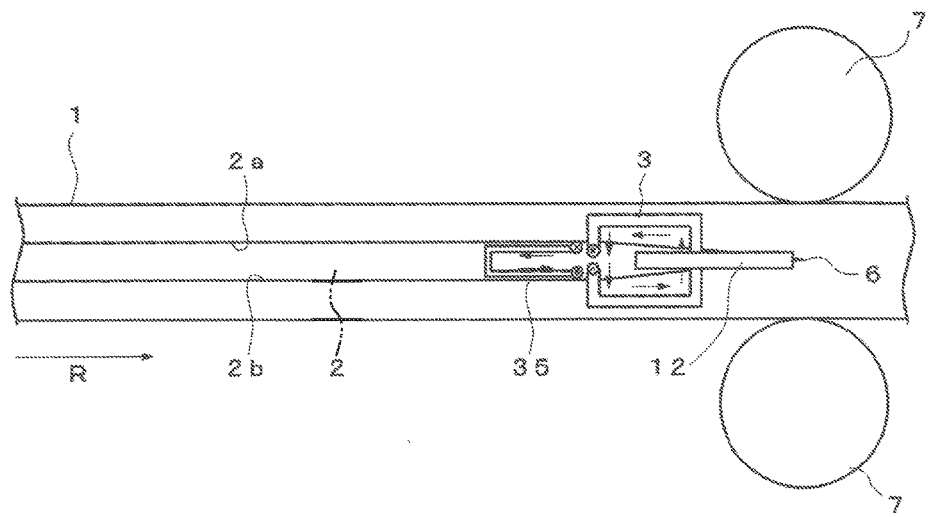
FIG. 40 is a plan view of an example in which a conductor is disposed inside an opening of an open pipe at the upstream side of the first induction coil illustrated in FIG. 34 and the conductor is moreover electrically insulated from the first induction coil, in a schematic diagram to explain an electric resistance welded pipe welding apparatus according to the other exemplary embodiment of the present invention.
Figure 41:
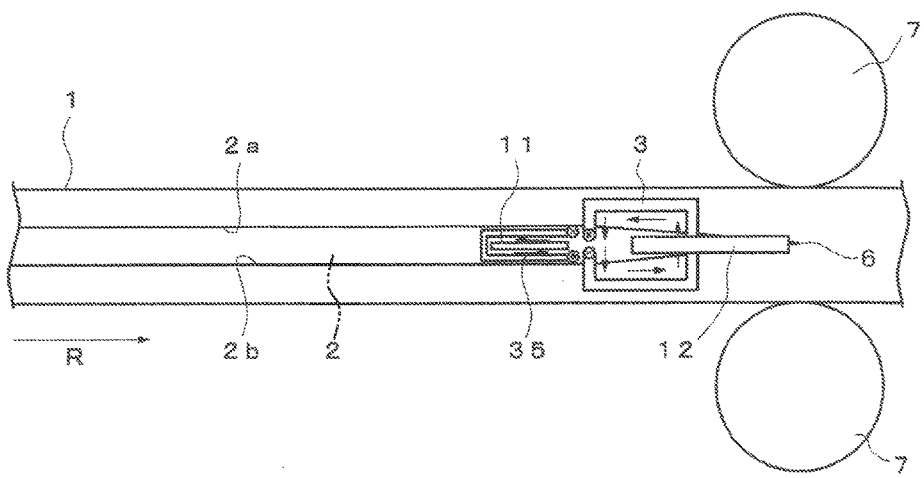
FIG. 41 is a plan view of an example in which a fourth ferromagnet is placed between conductor sections that form the conductor illustrated in FIG. 40, in a schematic diagram to explain an electric resistance welded pipe welding apparatus according to the other exemplary embodiment of the present invention.

In the present exemplary embodiment, the inside section 12a and the outside section 12b of the fifth ferromagnet 12 are formed substantially horizontally, following the open pipe 1 in the above diagrams; however, at least one of the inside section 12a and the outside section 12b may be disposed so as to slope such that the distance between the inside section 12a and the outside section 12b gradually increases, or gradually decreases, on progression downstream (not illustrated in the drawings). From the viewpoint of forming a favorable magnetic circuit, namely reducing the magnetic resistance, the distance between the inside section 12a and the outside section 12b preferably gradually reduces on progression downstream. From the same viewpoint, as illustrated in FIG. 39, the end portion of the downstream side end of the outside section 12b may be provided with a jutting out portion 12b2 that projects toward the inside section 12a.

It is possible for the fifth ferromagnet 12 provided in the present exemplary embodiment to be applied to a configuration equipped with the first induction coil 3 and the conductor 35, such as in the second exemplary embodiment described above, as illustrated in FIG. 40. As in the example illustrated in FIG. 41, a configuration in which a fourth ferromagnet 11 is provided inside a conductor 35 may also be adopted in a configuration in which a fifth ferromagnet 12 is provided so as to be disposed inserted into the first induction coil 3 and the opening 2.

Figure 42:
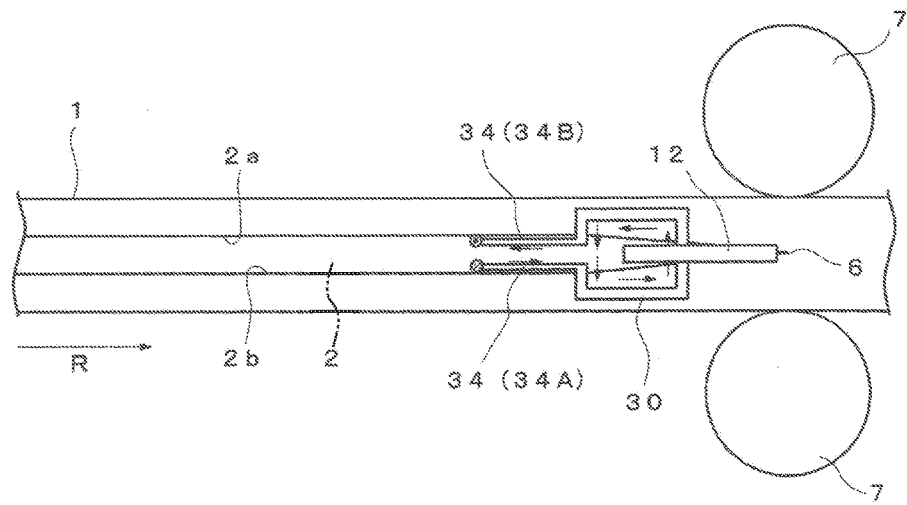
FIG. 42 is a plan view of an example in which a fifth ferromagnet is inserted into the first induction coil and the opening of the open pipe illustrated in FIG. 25, in a schematic diagram to explain an electric resistance welded pipe welding apparatus according to the other exemplary embodiment of the present invention.
Figure 43:
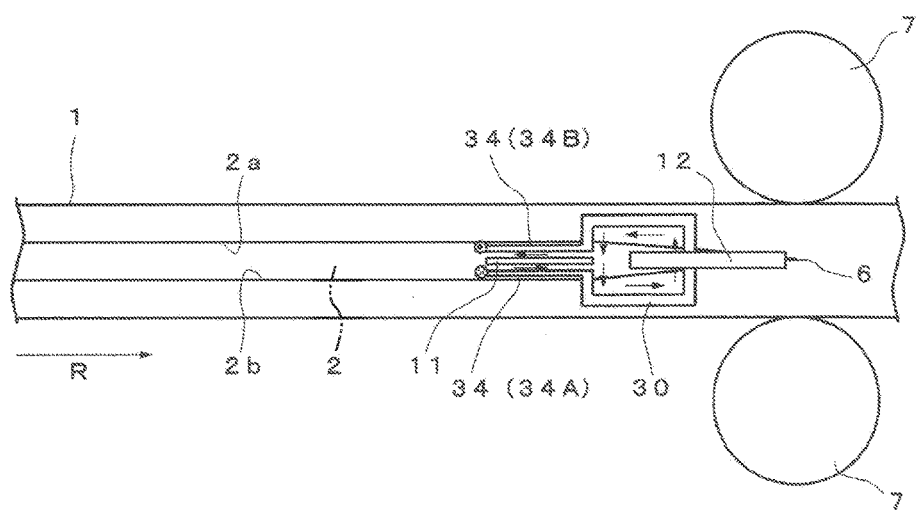
FIG. 43 is a plan view illustrating an example of a fourth ferromagnet further placed between the conductor sections of the conductor illustrated in FIG. 42, in a schematic diagram to explain an electric resistance welded pipe welding apparatus according to the other exemplary embodiment of the present invention.

In the present exemplary embodiment, as illustrated in FIG. 42, in the second exemplary embodiment described above, it is possible to adopt a configuration in which the fifth ferromagnet 12 is provided so as to be inserted into the first induction coil 30 and the opening 2 of the open pipe 1 of the example illustrated in FIG. 25. As illustrated in FIG. 43, it is possible to adopt a configuration in which the fourth ferromagnet 11 is installed between the conductor sections 34A, 34B illustrated in FIG. 42. Although details are not illustrated, it is possible to apply a configuration provided with the fifth ferromagnet 12 to the configuration illustrated in FIG. 32.

As explained above, according to the electric resistance welded pipe welding apparatus of the present invention, a configuration is adopted in which at least two or more closed circuits of induction current flowing inside the open pipe 1 are formed at the two outsides of the opening 2 in the vicinity of the two end parts 2a, 2b of the open pipe 1, and the first induction coil 3 is position separated from the opening 2 in the pipe outside direction, and does not encircle the outer circumference of the circular tube shaped open pipe 1, namely has a number of windings that is less than one lap of the outer circumference, and is formed in a closed circuit of at least one turn disposed so as to straddle the opening 2. Doing so enables the heating efficiency during electric resistance welded pipe welding to give a tube shape while bending a running metal strip 1 to be effectively raised with a simple apparatus, compared to conventional work coil methods, even in cases in which large diameter electric resistance welded pipe is being manufactured, and moreover facilitates set up. There is, moreover, little requirement to change the shape of the induction coil to match the dimension and profile of the electric resistance welded pipe being manufactured, enabling the number of work coils (induction coils) stocked to be reduced, thereby eliminating the need to have a large capacity of electrical equipment, and enabling the facility cost to be suppressed, as well as enabling introduction at low cost even when an existing power source is employed.

Accompanying raised heating efficiency as described above, it is possible to realize energy savings by reducing the amount of power used, or productivity can be raised by being able to raise the line speed in cases in which the same power is input. Moreover, there are immeasurable industrial advantageous effects due to it being possible to manufacture electric resistance welded pipes of sizes that were hitherto difficult to manufacture due to conventional limitations in power source capacity, and limitations due to burn out of impeders.

In the present invention, as described above, it is possible to manufacture electric resistance welded pipes from small diameters to large diameters using an electric resistance welded pipe welding apparatus of simple configuration, and it is particularly advantageous for efficient manufacturing of large diameter electric resistance welded pipes that have a reduction in heating efficiency during manufacture. It is possible to prevent damage to rolls arising from current flowing at the upstream side of the induction coil, and moreover passing a metal strip plate through the middle of the induction coil, as in the conventional case, is unnecessary, with excellent advantageous effects such as facilitating setting and replacing induction coils.

EXAMPLES

Examples are given below of the electric resistance welded pipe welding apparatus according to the present invention, and more specific explanation is given of the present invention. However the present invention is not limited to the following examples, and it is possible to implement additional appropriate modifications within a range to obtain the gist of the invention, as described above/below, and these are included in the technical range of the present invention.

The present examples have confirmed the advantageous effects of the present invention by static heating tests.

Example 1

Heated Member

Figure 44:
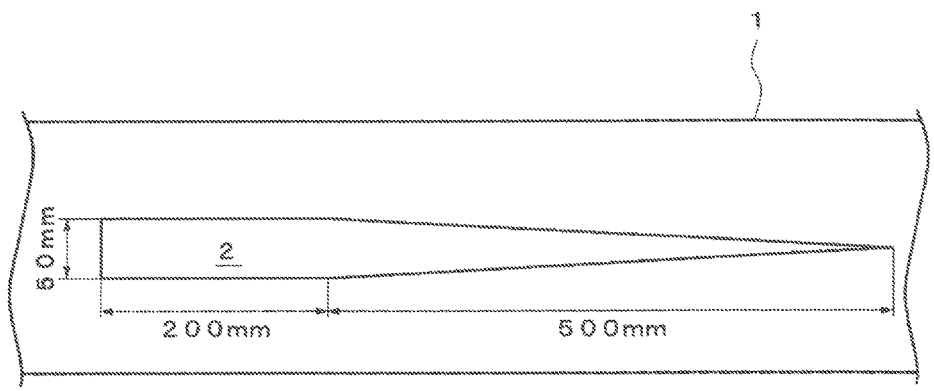
FIG. 44 is a schematic plan view of an open pipe formed with a model opening employed in advantageous effect confirmation tests of the present invention.

In the present example, an opening shape modeled as illustrated in FIG. 44, using laser cutting, to an upper portion of a carbon steel pipe for ordinary piping (SGP pipe), with an external diameter of 318.5 mm, wall thickness of 6.9 mm, and length of 1m (referred to below as open pipe), and was employed as a heated member. During laser cutting, an opening was opened with a gap at a parallel opening portion of 50 mm and a length of 200 mm from the left end portion in FIG. 44, followed by opening along a length of 500 mm, with an angle of 5.7 degrees between the apex modelling the join portion and the two end parts (a total opening of 700 mm). The apex had a radius of 0.5. mm Electric Resistance Welded Pipe Welding Apparatus In the electric resistance welded pipe welding apparatus employed in the present example, a $\varphi$10 mm water cooled copper pipe was employed as the induction coil, bent to 200 mm in the upstream-downstream direction, and 200 mm in the circumferential direction, as illustrated in FIG. 5 to FIG. 7, and disposed with a gap of 10 mm between the copper pipe and the open pipe. Power was input during heating with a frequency of 200 kHz at 20 kW, and the time until a maximum temperature of 1000° C. was achieved was recorded for static heating. The heating temperature was measured by welding 50μm type K thermocouples at a pitch of 20 mm from the join portion onto the end parts that face across the opening of the open pipe. In contrast to the example illustrated in FIG. 7, a ferrite core of thickness 8 mm was inserted as an impeder into a 5-layered water coolable cover made from epoxy resin, disposed over a range of 400 mm from directly below the join portion toward the upstream side.

Test Procedure

First, as an Invention Example 1, heating was performed with the above induction coil disposed with the downstream side (join portion side) end portion of the induction coil positioned 50 mm away from, and at the upstream side (the opening side) of, the join portion 6.

As an Invention Example 2, as well as disposing the induction coil in substantially the same manner as in the Invention Example 1, as illustrated in FIG. 15 and FIG. 16, heating was performed using ferrite cores in curved plate shapes (thickness: 15 mm, width (circumferential direction): 150 mm, length (upstream-downstream direction): 250 mm) as third ferromagnets, with two thereof employed at a distance of 5 mm from the induction coil on the back face of the induction coil (top face), disposed at the two end parts delineating the opening.

Figure 10:
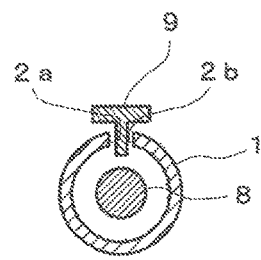
FIG. 10 is a cross-section illustrating an example of a T-shaped first ferromagnet placed between two end parts, in a schematic diagram to explain an electric resistance welded pipe welding apparatus according to the exemplary embodiment of the present invention.
Figure 11:
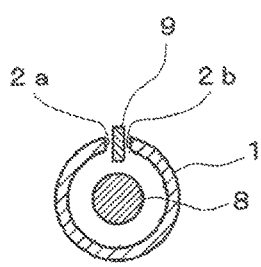
FIG. 11 is a cross-section illustrating an example of an I-shaped first ferromagnet placed between two end parts, in a schematic diagram to explain an electric resistance welded pipe welding apparatus according to the exemplary embodiment of the present invention.
Figure 12:
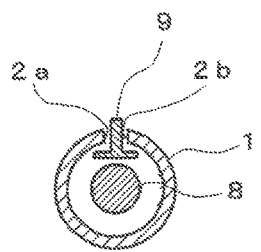
FIG. 12 is a cross-section illustrating an example of an inverted T-shaped first ferromagnet placed between two end parts, in a schematic diagram to explain an electric resistance welded pipe welding apparatus according to the exemplary embodiment of the present invention.

As an Invention Example 3, as well as disposing the induction coil in substantially the same manner as in the Invention Example 1, heating was performed using a T-shaped core made from ferrite such as those illustrated in FIG. 8A and FIG. 10 (length (running direction R): 150 mm, horizontal portion width: 100 mm, horizontal portion thickness: 20 mm, length of vertical portion leg: 50 mm, width of vertical portion: 30 mm) as a first ferromagnet, disposed 50 mm to the induction coil upstream side.

As an Invention Example 4, an induction coil similar to that of the Invention Example 2 was disposed together with a ferrite core (third ferromagnet) above the induction coil, and heating was performed with the T-shaped core employed in the Invention Example 3 (first ferromagnet) disposed 50 mm to the upstream side of the induction coil.

As a Comparative Example 1, similarly to conventionally, heating was performed with an induction coil with 1 T (turn) surrounding the outer circumference of the circular tube shaped open pipe (an induction coil manufactured from a water cooled copper plate with length direction width: 200 mm, internal diameter: 340 mm, and thickness: 10 mm) disposed 50 mm to the upstream side of the join portion.

As a Comparative Example 2, heating was performed with a 1T induction coil surrounding the outer circumference of the circular tube shaped open pipe, similar to that of the Comparative Example 1, disposed 250 mm to the upstream side of the join portion.

In each of the above tests, the speed of temperature rise of the join portion, and the speed of temperature rise of the end portions of the opening at a position 150 mm to the upstream side from the join portion, were compared. Each of the tests was performed in a state in which the rolls 7 were not provided.

The results of the Invention Examples 1 to 4, and the Comparative Examples 1, 2 are shown in the following Table 1.

TABLE 1

|  |  | Speed of Temperature Rise Ratio (—) | |
|---|---|---|---|
| Type | | Join Portion | Position 150 mm Upstream From Join Portion |
| Invention Examples | Invention Example 1 | 1.00 | 1.00 |
|  | Invention Example 2 | 2.15 | 2.30 |
|  | Invention Example 3 | 1.08 | 1.12 |
|  | Invention Example 4 | 2.21 | 2.40 |
| Comparative Examples | Comparative Example 1 | 0.67 | 0.16 |
|  | Comparative Example 2 | 0.33 | 0.27 |

The speed of temperature rise ratio illustrated in Table 1 indicates the proportional speed of temperature rise for each of the tests, where the heating speed of the join portion and the end portions of the opening in the Invention Example 1 is taken as 1. The heating speed considers the influence of heat of transformation, and the influence of radiation heat, and is the heating speed when the temperature of a position 150 mm from the join portion is heated to 500° C., or in cases in which 500° C. is not achieved, the heating speed at a maximum of 200 seconds.

As illustrated in Table 1, for the Comparative Example 1, 500° C. was not reached in 200 seconds at the steel pipe end parts and also the join portion due to the whole of the steel pipe warming.

In the Comparative Example 2, the induction coil is 250 mm away from the join portion, and although there was a certain amount of temperature rise at the steel pipe end faces, there was no significant rise in temperature.

However, in the Invention Example 1 applied with the electric resistance welded pipe welding apparatus of the present invention, it can be seen that there was rapid speed of temperature rise as a result of loss being small due to the induction coil not encircling the whole of the steel pipe, due to the closed circuits developing at the opening end faces inside the induction coil, and due to current flowing around the steel pipe end faces.

In the Invention Example 2, it can be seen that the speed of the temperature rise was 2 or more times that of the Invention Example 1 due to the magnetic flux being concentrated directly below the induction coil by placement of the third ferromagnet.

Moreover, due to the placement of the first ferromagnet in the Invention Example 3 (lacking the third ferromagnet) and the Invention Example 4 (with the third ferromagnet), rises of about 10% can be seen in the heating speed compared to the Invention Example 1 (lacking the third ferromagnet) and the Invention Example 2 (with the third ferromagnet), respectively, due to being able to prevent current flowing to upstream of the induction coil.

Example 2

In the present test examples, in contrast to in the Invention Examples 1 to 4 of Example 1 in which the induction coil was placed at a position 50 mm from the weld portion (join portion), testing was performed to consider cases in which the induction coil was placed at a position away from the weld portion due to there being cases in which the induction coil cannot be placed at a position close to the weld portion due to placement in the machine of the squeeze rolls, the top roll, and the like.

In the present example, with an apparatus like the one illustrated in FIG. 5, testing was performed with the electric resistance welded pipe welding apparatus 70 equipped with the first induction coil 30 and the conductor 34 electrically connected together, as illustrated in FIG. 25 and FIG. 26, in order to increase the amount of current flowing toward the join portion, due to there being a larger temperature rise at the two end parts 2a, 2b of the open pipe 1 surrounded by the induction coil (see reference numeral 3) and a smaller temperature rise at the join portion. Testing for the present example was performed employing only an induction coil, and without employing an impeder. In the present example, electric resistance welded pipe welding was performed with the induction coil configured as described above, under conditions similar to those of the above Example 1, except in the point that no impeder was employed.

Specifically, a first induction coil 30, having an upstream-downstream direction length: 100 mm, and circumferential direction width: 200 mm, was connected to the conductor 34 formed from a steel plate having an upstream-downstream direction length: 200 mm, height: 20 mm, and thickness: 3 mm.

Then, as the Invention Example 5, heating was performed with the thus configured induction coil and conductor were disposed with the end portion of the downstream side (join portion side) of the induction coil disposed at a position 150 mm away from, and on the upstream side (the opening side) of, the join portion 6.

As the Invention Example 6, in addition to disposing the above induction coil and conductor similarly to in the Invention Example 5, heating was performed, as illustrated in FIG. 27, with a ferrite core (fourth ferromagnet), of running direction R length: 200 mm, height 20 mm, and thickness: 5 mm, disposed between the two conductor sections 34A, 34B configuring the conductor 34.

As the Invention Example 7, in addition to disposing the above induction coil and conductor similarly to in the Invention Example 5, heating was performed with a sideways facing square-cornered U-shaped ferrite core, of running direction R length: 200 mm, width: 15 mm, and height 90 mm (see the fifth ferromagnet, such as in FIG. 34), inserted into the first induction coil 30 and the opening 2 of the open pipe 1.

As the Invention Example 8, in addition to disposing a ferrite core (fourth ferromagnet) between the two conductor sections 34A, 34B configuring the conductor 34 similarly to in the Invention Example 6, heating was performed with a sideways facing square-cornered U-shape ferrite core (fifth ferromagnet) disposed so as to be inserted into the first induction coil 30 and the opening 2 of the open pipe 1, similarly to in the Invention Example 7.

As a Comparative Example 3, similarly to in the Comparative Example 2, a 1T induction coil, circular tube shaped so as to surround the outer circumference of the open pipe, was disposed 250 mm to the upstream side of the join portion, and heating was performed by passing the same current through, and the speeds of temperature rise compared.

The results of the Invention Examples 5 to 8 and of the Comparative Example 3 are illustrated in Table 2.

TABLE 2

| | Type | Speed of Temperature Rise Ratio at Join Portion (—) |
|---|---|---|
| Invention Examples | Invention Example 5 | 1.45 |
| | Invention Example 6 | 1.60 |
| | Invention Example 7 | 2.72 |
| | Invention Example 8 | 3.11 |
| Comparative Examples | Comparative Example 3 | 1.00 |

The speed of temperature rise ratios illustrated in Table 2 illustrate the proportional speed of temperature rise in each of the tests, where the heating speed in the Comparative Example 3 is taken as 1.

As illustrated in Table 2, in the Invention Example 5 it was confirmed that heating speed was 45% faster than the conventional Comparative Examples 1, 2 in which induction coils surround the outer circumference of the steel pipe (open pipe).

Moreover, in the Invention Example 6, it was confirmed that heating speed was a further 15% faster due to inserting the ferrite core as the fourth ferromagnet between the two conductor sections 34A, 34B configuring the conductor 34 on the upstream side.

In the Invention Examples 7, 8, it was confirmed that heating speeds were achieved of respectively two times or greater than those of the Invention Examples 5, 6 due to inserting the sideways facing square-cornered U-shaped ferrite core described above as the fifth ferromagnet into the first induction coil 30 and the opening 2 of the open pipe 1, and it is clear that effective heating is possible.

In the present example, a simple set up sufficed of placing the induction coil above the steel pipe (open pipe), and it was confirmed that there was no large change in heating speed even for changes of approximately±10% in the steel pipe diameter.

Example 3

In the present example, a rectangular shaped induction coil (first induction coil) with a length of 250 mm and a width of 200 mm formed from a copper pipe with an external diameter of 10 mm, an internal diameter of 8 mm, was disposed above a steel pipe (open pipe) with an external diameter of 318.5 mm, wall thickness of 6.9 mm and length of 1 m. When doing so, the induction coil was curved around to form a saddle shape such that the distance from the open pipe was 10 mm (fixed). Cooling was performed by flowing cooling water through the inside of the induction coil. The induction coil was placed at a position 150 mm away from the join portion. The opening of the open pipe was formed in the same shape as that of Example 1. In the Invention Example 9, as illustrated in FIG. 13, a ferrite core, of width (circumferential direction) 10 mm, length (running direction R) 65 mm, height 30 mm, was additionally placed, as a second ferromagnet, inside the induction coil and inside the opening, from a position 190 mm from the join portion (30 mm from the induction coil) to a position 255 mm from the position of the join portion, so as to protrude 10 mm out from the top face of the end parts of the open pipe, and static heating was performed with a welding current of 800 A for a duration of 10 seconds.

In the Invention Example 10, the length of the ferrite core was 130 mm, and it was placed from a position 190 mm from the join portion (30 mm from the induction coil) to a position of 320 mm from the join portion, and static heating was performed in the same manner.

In the Invention Example 11, the length of the ferrite core was 195 mm, and it was placed from a position 190 mm from the join portion (30 mm from the induction coil) to a position of 385 mm from the join portion, and static heating was performed in the same manner.

In the Invention Example 12, as a reference, the above ferrite core was not disposed inside the opening of the open pipe, and static heating was performed in the same manner.

Evaluation, in the Invention Examples 9 to 12, the temperature change on the end faces of the open pipe at the running direction intermediate position of the portion surrounded by the induction coil, and the respective temperature changes on the end faces of the open pipe at the intermediate position between the downstream side end portion of the induction coil and the join portion (a position 75 mm from the join portion), were measured. The proportional rise in temperature at each point was derived for the Invention Examples 9 to 11, and evaluated with respect to the rise in temperature of the Invention Example 12. The results are illustrated in Table 3.

TABLE 3

| | Ferrite Core Length (mm) | Temperature Change of End Face of Open Pipe at Central Position of Portion Surrounded by First Induction Coil (—) | Temperature Change of End Face of Open Pipe at Central Position Between Downstream Side End of Induction Coil and Join Portion (—) |
|---|---|---|---|
| Invention Example 9 | 65 | 0.50 | 1.20 |
| Invention Example 10 | 130 | 0.43 | 1.25 |
| Invention Example 11 | 195 | 0.37 | 1.33 |
| Invention Example 12 | None | 1.00 | 1.00 |

According to the results of Table 3, there was a gentle temperature rise at locations on the end face of the open pipe positioned inside the induction coil due to placing the ferrite core as the second ferromagnet between the end faces of the open pipe surrounded by the induction coil, and there was increased temperature rise at location of the end face of the open pipe nearer to the join portion side. This shows that the current flowing in the end face of the open pipe at the position inside the induction coil is decreased, and the current flowing toward the join portion side is increased by that amount, and shows that the efficiency of the electric resistance welded pipe welding apparatus of the present invention is raised by placement of the ferrite core as the second ferromagnet.

The invention claimed is:

1. An electric resistance pipe welding apparatus for manufacturing an electric resistance welded pipe, in which two end parts of an open pipe having an opening extending in a running direction, the two end parts facing the opening, are melted by an induction current, and the two end parts are placed in contact with each other and welded together at a join portion while gradually closing the gap of the opening, apparatus comprising:

an induction coil that is disposed above the opening and outside the open pipe so as not to encircle an outer circumference of the open pipe and that forms a primary current circuit straddling the opening such that when forming the primary current circuit by passing a high frequency current through the induction coil, the primary current circuit is formed such that, at a portion of the open pipe below the induction coil and at two outer sides of the opening, one or more secondary current closed circuits including an induction current passing through at least each of the end parts of the open pipe are formed in a vicinity of each of the two end parts; and a ferromagnet that includes an inside section extending in the running direction inside the open pipe, an outside section extending in the running direction outside the open pipe, and a center section extending between the inside section and the outside section and placed inside a space defined by the induction coil, the ferromagnet being disposed with an open space side, which is defined by portions of the inside section and the outside section further toward a downstream side than the center section and by the center section, facing toward the running direction downstream side, and the ferromagnet forming a closed circuit of magnetic flux passing through the inside section, the center section, and the outside section.

2. The electric resistance pipe welding apparatus of claim 1, wherein the frequency of the high frequency current is 100 kHz or higher.

3. The electric resistance pipe welding apparatus of claim 1, further comprising a first ferromagnet disposed further to an upstream side than the induction coil in the running direction of the open pipe, and between the two opposing end parts.

4. The electric resistance pipe welding apparatus of claim 3, wherein a cross-sectional profile of the first ferromagnet is a T-shape, an inverted T-shape, an I-shape, or an H-shape turned on its side, in cross-section orthogonal to the running direction of the metal strip.

5. The electric resistance pipe welding apparatus of claim 1, further comprising a second ferromagnet disposed between the two end parts of the open pipe and inside the induction coil.

6. The electric resistance pipe welding apparatus of claim 1, further comprising a third ferromagnet that at least partially covers the induction coil, above the induction coil.

7. The electric resistance pipe welding apparatus of claim 6, wherein the third ferromagnet has a configuration that divides, at a position corresponding to the opening in the open pipe, into a first half covering substantially a half of the induction coil and a second half covering substantially a remaining half of the induction coil.

8. The electric resistance pipe welding apparatus of claim 1, wherein, at an upstream side of the induction current passing through each of the end parts of the open pipe at the secondary current closed circuits formed by the primary current circuit of the induction coil, a conductor, including a pair of conductor sections provided so as to be separated from and to face toward the end parts, is disposed inside the opening at the running direction upstream side of the open pipe so as to generate an induction current in an opposite direction to the induction current in each of the end parts of the open pipe.

9. The electric resistance pipe welding apparatus of claim 8, wherein the conductor is electrically connected to the induction coil.

10. The electric resistance pipe welding apparatus of claim 8, wherein a fourth ferromagnet extending along the pair of conductor sections is disposed between the pair of conductor sections of the conductor.

11. The electric resistance pipe welding apparatus of claim 10, wherein the fourth ferromagnet is electrically insulated from the pair of conductor sections.

12. The electric resistance pipe welding apparatus of claim 1, wherein at least one downstream side end portion of the outside section or the inside section of the ferromagnet has a branched shape.

13. The electric resistance pipe welding apparatus of claim 1, wherein the induction coil is formed such that a distance to the open pipe widens from the opening towards sides.

* * * * *